United States Patent
Matitsine et al.

(10) Patent No.: US 11,025,472 B2
(45) Date of Patent: *Jun. 1, 2021

(54) MULTI-BEAM MIMO ANTENNA SYSTEMS AND METHODS

(71) Applicant: Matsing, Inc., Irvine, CA (US)

(72) Inventors: Serquei Matitsine, Dallas, TX (US); Igor Timofeev, Dallas, TX (US); Leonid Matytsine, Irvine, CA (US); Anthony DeMarco, Leadville, CO (US)

(73) Assignee: Matsing, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/796,841

(22) Filed: Feb. 20, 2020

(65) Prior Publication Data

US 2020/0195481 A1 Jun. 18, 2020

Related U.S. Application Data

(63) Continuation of application No. 16/264,652, filed on Jan. 31, 2019, now Pat. No. 10,608,859, which is a continuation of application No. 15/867,393, filed on Jan. 10, 2018, now Pat. No. 10,381,716.

(Continued)

(51) Int. Cl.
*H04W 4/00* (2018.01)
*H04L 27/26* (2006.01)
(Continued)

(52) U.S. Cl.
CPC ....... *H04L 27/2647* (2013.01); *H01Q 1/2291* (2013.01); *H01Q 1/246* (2013.01);
(Continued)

(58) Field of Classification Search
None
See application file for complete search history.

(56) References Cited

U.S. PATENT DOCUMENTS

| 6,081,233 A | 6/2000 | Johannisson |
| 7,605,768 B2 | 10/2009 | Ebling et al. |

(Continued)

FOREIGN PATENT DOCUMENTS

| WO | 2010092078 A2 | 8/2010 |
| WO | 2014118011 A1 | 8/2014 |
| WO | 2015035400 A2 | 3/2015 |

OTHER PUBLICATIONS

International Search Report for International Application No. PCT/US2018/013219, dated Apr. 27, 2018, 6 pages.

*Primary Examiner* — Phuongchau Ba Nguyen
(74) *Attorney, Agent, or Firm* — Fish IP Law, LLP

(57) ABSTRACT

This application proposes multi-beam antenna systems using spherical lens are proposed, with high isolation between antenna ports and compatible to 2×2, 4×4, 8×8 MIMO transceivers. Several compact multi-band multi-beam solutions (with wideband operation, 40%+, in each band) are achieved by creating dual-band radiators movable on the track around spherical lens and by placing of lower band radiators between spherical lenses. By using of secondary lens for high band radiators, coupling between low band and high band radiators is reduced. Beam tilt range and side lobe suppression are improved by special selection of phase shift and rotational angle of radiators. Resultantly, a wide beam tilt range (0-40 degree) is realized in proposed multi-beam antenna systems. Each beam can be individually tilted. Based on proposed single- and multi-lens antenna solutions, cell coverage improvements and stadium tribune coverage optimization are also achieved, together with interference reduction.

9 Claims, 19 Drawing Sheets

Related U.S. Application Data

(60) Provisional application No. 62/538,615, filed on Jul. 28, 2017, provisional application No. 62/445,874, filed on Jan. 13, 2017.

(51) Int. Cl.
*H01Q 1/22* (2006.01)
*H01Q 3/14* (2006.01)
*H01Q 3/24* (2006.01)
*H01Q 3/30* (2006.01)
*H01Q 19/06* (2006.01)
*H01Q 25/00* (2006.01)
*H01Q 1/24* (2006.01)

(52) U.S. Cl.
CPC .............. *H01Q 3/14* (2013.01); *H01Q 3/24* (2013.01); *H01Q 3/30* (2013.01); *H01Q 19/062* (2013.01); *H01Q 25/001* (2013.01)

(56) References Cited

U.S. PATENT DOCUMENTS

| | | |
|---|---|---|
| 8,482,478 B2 | 7/2013 | Hartenstein |
| 10,381,716 B2 * | 8/2019 | Matitsine ............ H04L 27/2647 |
| 10,574,498 B2 * | 2/2020 | Matitsine ............ H04L 27/2647 |
| 10,608,859 B2 * | 3/2020 | Matitsine ............ H04L 27/2647 |
| 2006/0028386 A1 | 2/2006 | Ebling et al. |
| 2011/0205119 A1 | 8/2011 | Timofeev et al. |
| 2011/0310921 A1 | 12/2011 | Chann et al. |
| 2012/0287005 A1 | 11/2012 | Pintos et al. |
| 2013/0093634 A1 | 4/2013 | Rowson et al. |
| 2016/0013563 A1 | 1/2016 | Timofeev et al. |
| 2016/0111793 A1 | 4/2016 | Montgomery et al. |
| 2017/0062944 A1 * | 3/2017 | Zimmerman ........ H01Q 19/062 |
| 2018/0131078 A1 | 5/2018 | Shooshtari et al. |
| 2019/0037416 A1 * | 1/2019 | Linehan ................ H04W 16/28 |

\* cited by examiner

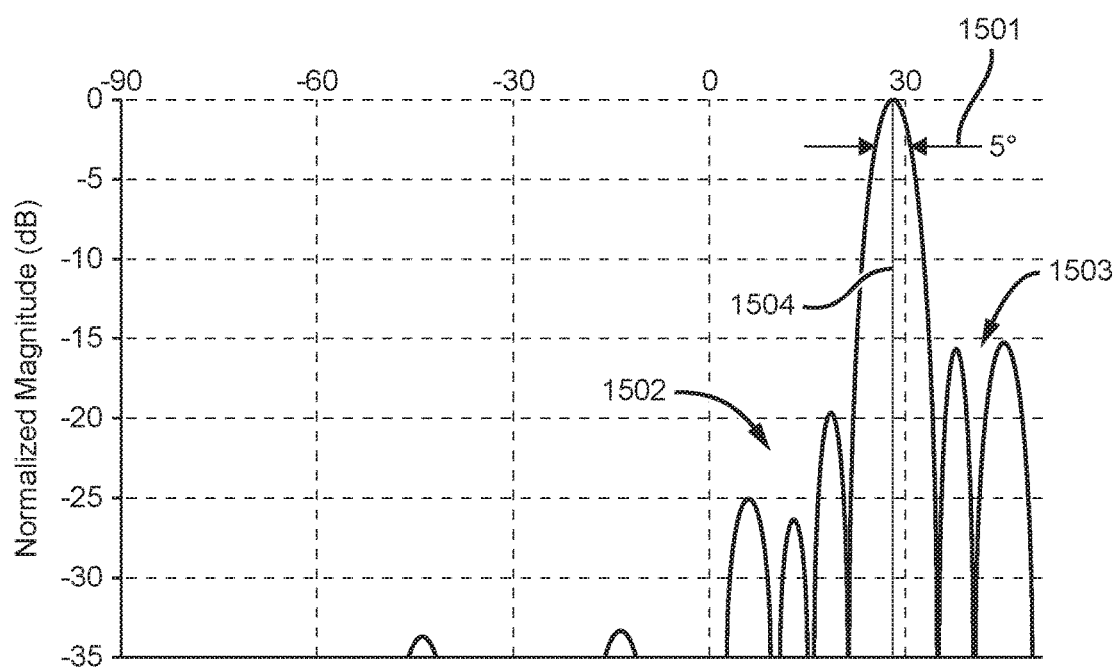
FIG. 15
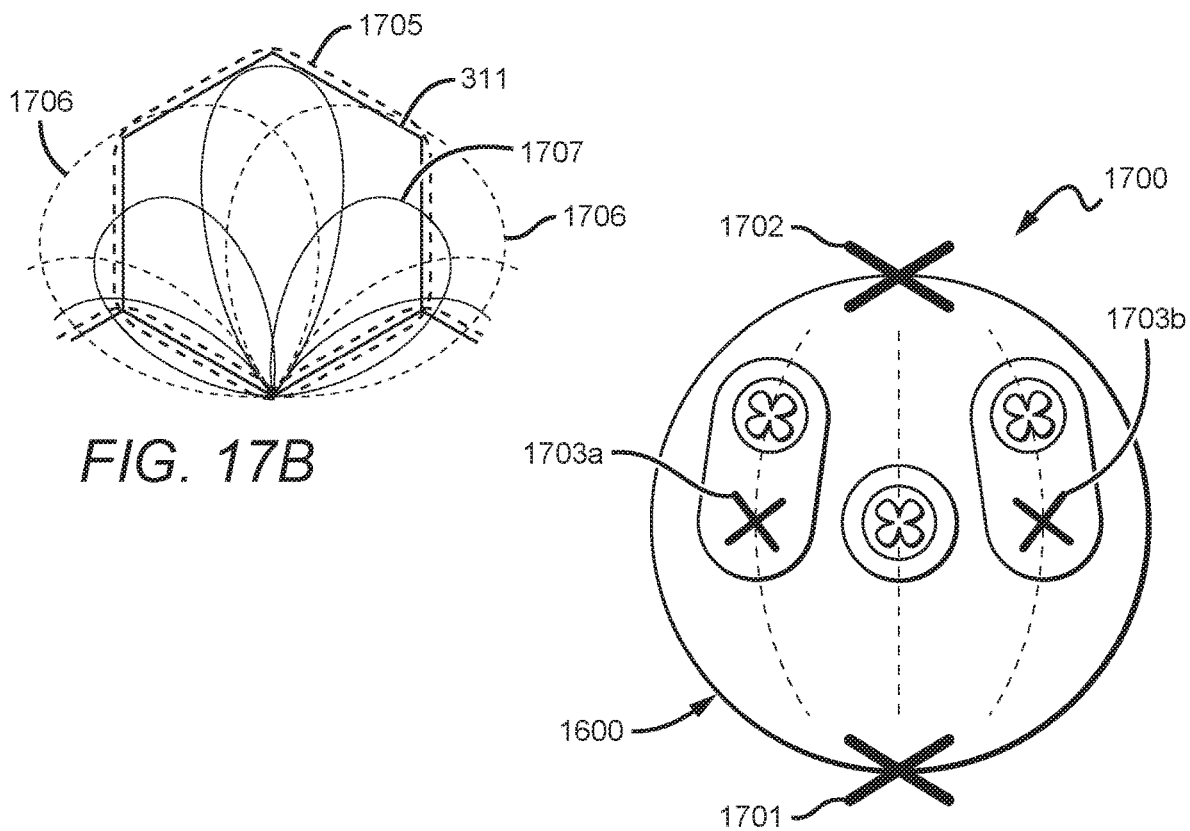
FIG. 17B
FIG. 17C

MULTI-BEAM MIMO ANTENNA SYSTEMS AND METHODS

This application is a continuation of U.S. Non-Provisional application Ser. No. 16/264,652, filed Jan. 31, 2019, which is a continuation of U.S. Non-Provisional application Ser. No. 15/867,393, filed Jan. 10, 2018, which claims the benefit of U.S. provisional application No. 62/445,874 filed Jan. 13, 2017, and U.S. provisional application No. 62/538,615 filed Jul. 28, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is communication devices.

BACKGROUND

The following description includes information that may be useful in understanding the present invention. It is not an admission that any of the information provided herein is prior art or relevant to the presently claimed invention, or that any publication specifically or implicitly referenced is prior art.

Current and future wireless communication systems focus on higher capacity. Two main methods of capacity increase in modern cellular systems are to provide Multiple Input, Multiple Output ("MIMO") and cell splitting capabilities.

MIMO is a method used to increase the capacity of radio links by using multiple (or multi-port) antennas. Typically, high isolation between antenna ports is required (See, "MIMO Processing for 4G and Beyond: Fundamentals and Evolution" by Mario Marques da Silva, Francisco A. Monteiro, CRC Press, 2014). In the MIMO antenna disclosed in U.S. Pat. No. 8,482,478 entitled "MIMO Antenna System", absorber material is used for isolation between antenna ports. However, the absorber in that application can cause signal degradation and passive inter-modulation (PIM) issues, which is not acceptable for 3G, 4G/LTE cellular systems.

Existing MIMO antennas (see, for example CommScope R4VP306R for 4×4 MIMO http://www.commscope.com/catalog/wireless/product_details.aspx?id=23598) are bulky and are not multi-beam.

One of the most effective ways to provide cell splitting capabilities is by use of multi-beam antennas (based on Butler Matrix https://www.microwaves101.com/encyclopedias/butler-matrix, U.S. publication 2016/0013,563 entitled "Wideband Twin Beam Antenna Array" and U.S. publication 2011/0205119 entitled "Dual-Beam Sector Antenna and Array", and U.S. Pat. No. 6,081,233, entitled "Butler Beam Port Combining For Hexagonal Cell Coverage"). U.S. Pat. No. 7,605,768 entitled "Multi-beam Antenna" discloses multi-beam antenna based on spherical lens, but all listed previous examples are not applicable for MIMO because of poor isolation between antenna ports. Antenna ports in other attempted solutions typically exhibit 13-15 dB isolation, which is not enough for a wide operational frequency band.

Therefore, multi-beam antennas attempted by others cannot provide wideband MIMO performance required for current and future cellular communications, and MIMO antennas attempted by others are not suitable for multi-beam operation.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved antennas can increase capacity in wireless communication systems.

SUMMARY OF THE INVENTION

The inventive subject matter provides apparatus, systems and methods to provide MIMO functionality with a multi-beam antenna system.

The goal of the invention is to create a compact, multi-beam, wideband/multi-band, base station antenna with MIMO capabilities and wide tilt range for each beam.

Using of a spherical RF lens allows for marriage of MIMO and multi-beam technologies for tremendous increase of communication system capacity, which is not achievable in other attempted solutions. Lens is ultra-wideband, naturally multi-beam and MIMO friendly, i.e. compatible to MIMO transceivers. One of unique features of multi-beam antenna based on spherical lenses is the high isolation between ports, which greatly benefits to MIMO performance. For example, for a 3-beam lens based antenna, isolation more than 27 dB was measured in 50%+ frequency range. Spherical lens antennas can be used as building blocks for multi-beam antennas with high-order MIMO (4×4 and 8×8).

Below, 3-beam antenna solutions for 2×2, 4×4, 8×8, and N×N (where N>2) MIMO is disclosed with the following embodiments:

single band, such as high-band (HB) or low-band (LB) antennas;

cell coverage optimization;

2-band antennas for stadium coverage (operational frequency bands are different from one group of beams to another);

2-band solutions with combinations of three HB beams and one LB beam;

2-band solution with combinations of three HB beams and two LB beams;

3-band solution with combinations of three or more HB beams, two or more MB beams, and one or more LB beam(s);

scalability to M-band (where M>3) solutions with combinations of U quantity of >HB (e.g., UHB, etc.), three or more HB beams, two or more MB beams, and one or more LB beam(s); and >25 dB isolation between antenna in a wide operational frequency band, 40%+ (for any combination of two antenna ports of the multi-beam antenna system).

As a result, a communication system capacity can be increased more than 10 times compared to a regular one-port antenna. For example, a 3-beam antenna with 4×4 MIMO (first embodiment) increases capacity by about 12 times. Specifically, 3 (because of 3 beams)×4 (4×4 MIMO)=12 compared to simple one port antenna. One or more of these benefits are not achievable with other attempted solutions. Furthermore, capacity shaping can be increased by increasing a quantity of HB antennas to create a higher quantity of beams in an azimuth plane for a given hexagonal cell.

Asymmetric left outer beams and right outer beams generated by the 2-polarized, e.g., crossed-dipole, radiators in the antenna assembly can be accomplished by one or more of the following apparatus and methods. First, asymmetric beams can be formed by tilting one or more of the radiating elements associated with a given lens by a different amount (e.g., tilting outer radiating elements more than a center radiating element). Second, asymmetric beams can be formed by offsetting more or less, the first left and first right radiating element from a center (point) of the spherical lens. Third, asymmetric beams can be formed by phase shifting a second left or a second right radiating element. Fourth, asymmetric beams can be formed by biasing (adjusting or selecting) a division of power, amplitude, phase, division coefficient between a coupled pair of radiators, e.g., the HB crossed dipoles.

Multi-beam MIMO antennas with other numbers/combinations of beams (for example 2-, 4-, 5-beam antennas) can be also realized based on disclosure principles.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

Example embodiments are illustrated by way of example and not limitation in the figures of the accompanying drawings, in which like references indicate similar elements and in which:

FIG. 15 is a normalized magnitude elevation pattern of the HB antenna shown in FIG. 16A calculated for 2.7 GHz and 28° beam tilt, according to one embodiment.

FIG. 17B is a hexagonal cell coverage of a 3-band antenna, according to one embodiment.

FIG. 17C is a single 3-band antenna, with one beam for a first band, two beams for a second band, and three beams for a third band, according to one embodiment.

DETAILED DESCRIPTION

Figure 1A:
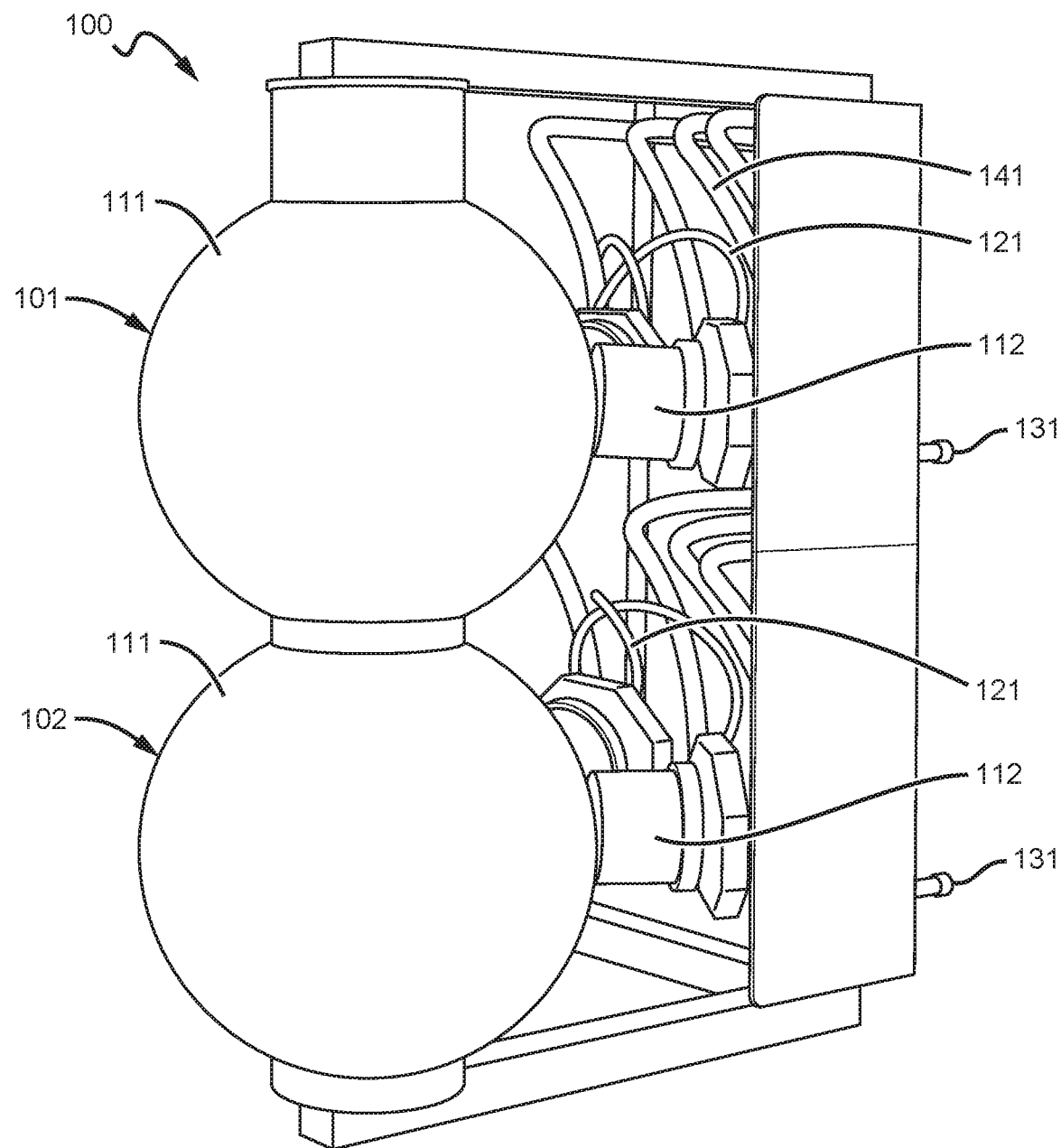
FIG. 1A is an oblique-view of a 3-beam antenna with 4×4 MIMO for each beam, according to one embodiment.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. In addition, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group (or subgroup) member can be referred to and claimed individually or in any combination with other members of the group (or subgroup) or other elements found herein. One or more members of a group (or subgroup) can be included in, or deleted from, a group (or subgroup) for reasons of convenience and/or patentability. When any such inclusion or deletion occurs, the specification is herein deemed to contain the group (or subgroup) as modified thus fulfilling the written description of all Markush groups used in the appended claims.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should appreciate that the inventive subject matter allows lens spheres to be positioned quite close to one another, almost touching, and allows multiple bands to be focused through the same lens towards the same geographic area without interfering (insubstantial interference) with one another (e.g., isolation of at least 25 dB).

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Although all embodiments below are shown for 3-beam antenna systems (forming three beams in azimuth plane with individual tilt for each beam and with MIMO capabilities for each beam), any other number of beams are possible.

Figure 1B:
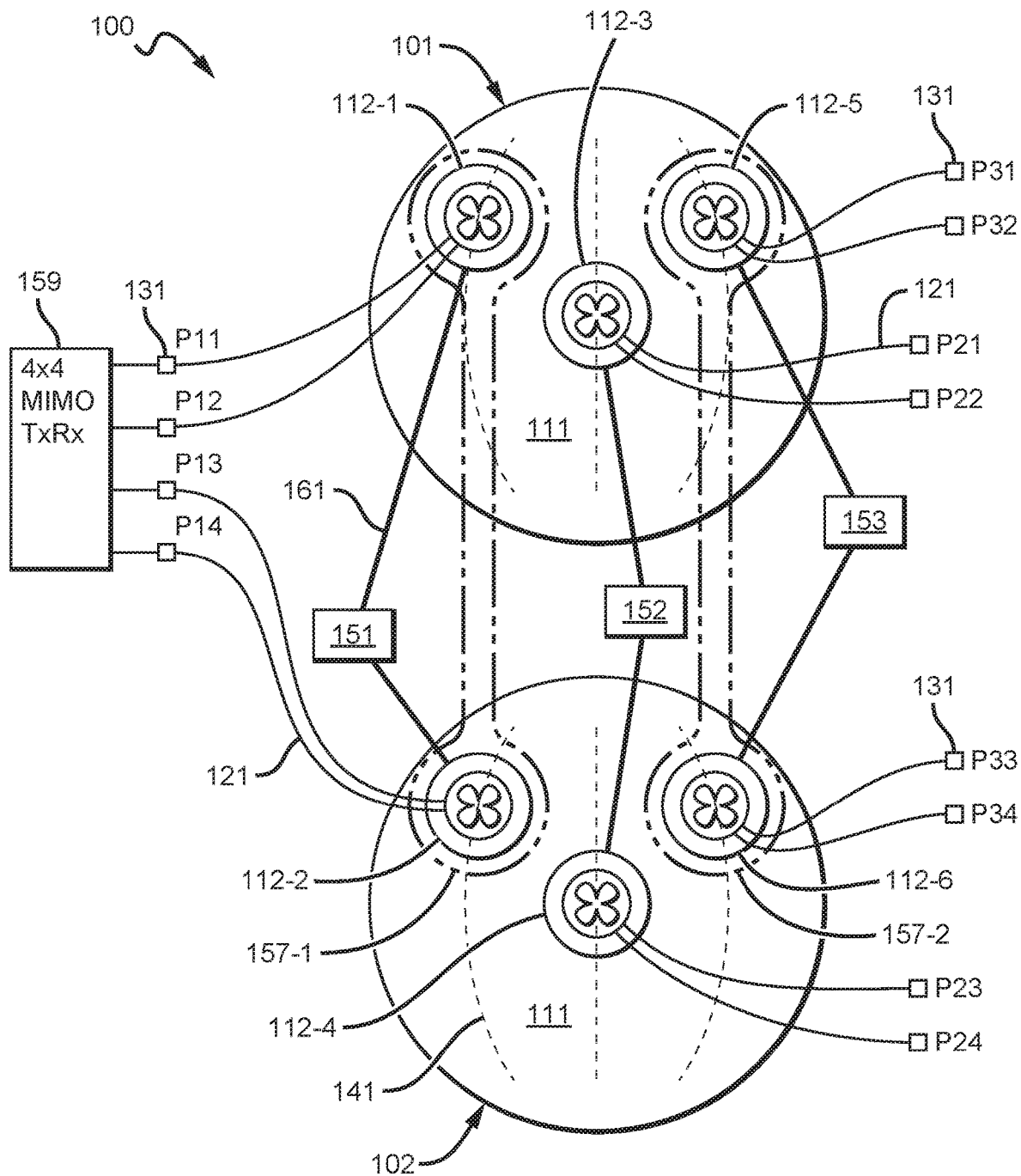
FIG. 1B is a back view of the 3-beam antenna system with 4×4 MIMO for each beam, according to one embodiment.

FIGS. 1A and 1B are related to an antenna system 100 that is a 3-beam 4×4 Multiple Input Multiple Output (MIMO) 12 port antenna system embodiment based on two lens antennas 101, 102, with one located vertically above the other (disposed along the same vertical plane). Multi-beam spherical lens antennas 101, 102 can be used as building blocks for higher order (larger) MIMO systems (e.g., 4×4, 8×8, 12×12, 16×16, 32×32, etc. MIMO) to provide compact and high performance MIMO in wide or ultra-wide frequency band. Even with a dense arrangement (see FIGS. 5A-5D), isolation between all 24 ports is >27 dB in 50%+ frequency band, supporting low correlation between MIMO channels. In FIG. 1A, an oblique view is shown, and FIG. 1B is showing schematics of the antenna system 100.

Each of the lens antennas 101, 102 has a spherical lens 111 and three 2-polarized radiators 112, also known as a dual-polarized antenna. For compactness, spherical lenses 111 are either a homogeneous or a heterogeneous dielectric sphere with a dielectric constant of 1.7-2.5, 1.5 to 2.0, or 2.0 to 4.0, and have a diameter of either 2 to ~2.5, 1.5 to 2, or 2 to 3 wavelengths of observed radiation from the radiator used, such as 2-polarized radiator 112. For some applications, a multi-layer lens (Luneburg style) is used, and the shape of the lens can be slightly different from a spherical shape, e.g., it can be out of round by up to 10% or 20% at any location from a perfect sphere. In other words, the lens can be flatter at the top and/or bottom by −10% to 20% and/or wider at the center by +10% to 20%, or it can be more pointed at the top and/or bottom by +10% to 20% and/or less wide at the center by −10% to 20%. As used herein, a spherical lens that focuses EM waves, or that forms beams 'with' or 'to' a radiator, actually functions to accomplish two things. First, it focuses EM waves from a distant source towards the radiator (i.e., the antenna assembly functions as a receiver for a beam received from the distant source as seen by each individual radiator/spherical lens combination). Second, it focuses EM waves generated by the EM radiator through the lens towards a distant geographical area target (i.e., the antenna assembly functions as transmitter that forms a beam from each radiator/spherical lens combination). Radiator 112 thus functions as a receiver ("Rx") and/or as a transmitter ("Tx") and typically provides both functions of Tx and Rx as a transceiver ("TxRx"). More information on dielectric spherical lens and material can be found in U.S. Pat. No. 8,518,537B2, issued Aug. 27, 2013, and entitled "Spherical Dielectric Lens", which is incorporated herein by reference in its entirety.

The 2-polarized radiator 112 has two orthogonal polarizations. Preferably, 2-polarized radiator 112 has an axis-symmetrical radiation pattern (i.e., elevation and azimuth beam width should be the same) and slant +/−45° linear polarization basis is the most popular in cellular communications, but other orthogonal polarization basis can be used such as a horizontal and vertical (H-V basis), or left hand and right hand circular (R-L basis). An example of a 2-polarized radiator 112, suited to work with spherical lens, is described in Singapore patent 10201405345V, granted Nov. 3, 2016, which is incorporated herein by reference herein. Different embodiments of 2-polarized radiators can be used in antenna system 100, including patch, Yagi-Uda (Yagi), waveguide, horn, spiral, and helical types of 2-polarized radiators. The 2-polarized radiator 112 can also include other components (such as secondary lens, directors, parasitic elements for beam width stabilization and/or for port-to-port isolation and cross-polarization improvements, etc.). Good port-to-port isolation (typical >30 dB) and cross-polarization (typical <−18 dB) of 2-polarized radiator 112 are important for MIMO performance in one embodiment. To get a symmetrical pattern of lens antenna 101, 102, each 2-polarized radiator 112 is pointed to a center of spherical lens 111. In some cases, to get an asymmetrical pattern, 2-polarized radiator 112 can be pointed, or directed, offset of center (i.e., a center point) of spherical lens 111. This can be accomplished by statically adjusting left 2-polarized radiator 112-1 and 112-2, and/or right 2-polarized radiator 112-5 and 112-6 to point off-center during manufacture or installation of antenna system 100, and/or by dynamically adjusting same via adjustable mounting hardware (not shown) that allows said offset during operation. A resulting asymmetrical pattern from offsetting polarized radiator 112 is shown in subsequent FIG. 3C.

All radiators 112 operate in a single RF band in the present embodiment, and thus form a single group for the given RF band (e.g., a high band). The two left radiators 112-1 and 112-2 are arranged in a subgroup 157-1 disposed on the left side of antenna system 100 that is coupled to MIMO transceiver 159. Similar coupling exists between two center radiators 112-3 and 112-4 for a center subgroup (dashed line not shown for clarity of figure) that is coupled to another MIMO transceiver (not shown). Finally, right two radiators 112-5 and 112-6, form subgroup 157-2 that is coupled to yet another MIMO transceiver (not shown). The radiators within each respective subgroup, for at least the HB band, are disposed approximately in a vertical plane. For example, radiators 112-1 and 112-2 of subgroup 157-1 are disposed in a vertical plane to the left of a vertical centerline of the two spherical lenses 101 and 102. Likewise, radiators 112-5 and 112-6 are disposed in a vertical plane to the right of the vertical centerline formed by the two spherical lenses 101 and 102. Some variation in positioning of radiators to be outside of a given vertical plane (i.e., asymmetrical in one or more planes) is utilized in some embodiments for custom beam forming.

In receive mode, a 2-polarized radiator transforms electromagnetic (EM) waves propagating in a medium (free space, spherical lens, secondary lens) to EM waves propagating in coaxial cable (or other transmission line). In transmit mode, the 2-polarized radiator transforms EM waves propagating in one coaxial cable to EM waves propagating in a medium with polarization +45 deg, and it also transforms EM wave propagating in second coaxial cable to EM wave propagating in media with polarization −45 deg. An EM wave is defined not only by polarization, but also by amplitude, frequency, phase, and by changing (modulation) of these characteristics as the signal is transmitted.

Schematics of the antenna system 100 is shown in FIG. 1B (back view, spherical lens is shown as transparent for clarity).

Each 2-polarized radiator 112 has two flexible RF cables 121 (each related to one of two orthogonal polarizations) with antenna connector 131 including 4 connectors per each of three beams, for a total of twelve connectors 131, as shown in FIG. 1B. Four connectors for each beam connect to a related 4×4 MIMO transceiver 159. As shown in FIG. 1B, antenna connectors 131 of 1st beam P11, P12, P13 and P14 are connected to first beam MIMO transceiver 159.

MIMO processing for each beam is achieved by combining polarization diversity (2 orthogonal polarization) and spatial diversity (2~2.5 wavelength separation between antennas 101, 102).

As shown in FIGS. 1A and 1B, 2-polarized radiators 112 are moving on tracks 141 around spherical lens 111 and providing desirable beam tilt (for example, 0 to 40 degrees) by using control mechanisms 151, 152, 153 and mechanical linkages 161. Tracks 141 are disposed in an approximately vertical plane, or in an oblique plane in a different embodiment. However, the actual path of the 2-polarized radiator maintaining an approximately constant clearance distance from the surface of the spherical lens 111 results in a path that is a curved arc in two or three dimensions, the latter for an oblique path when viewed from the side, top, or front. In one embodiment, the clearance distance is minimized for best transmission. Different embodiments provide clearance ranges as follow: between 2-10 mm, between 2-50 mm, and beyond 50 mm. The track follows the contour of the sphere, whether the sphere is essentially spherical, is slightly out of round, or is intentionally out of round, being oblong or short and fat in the center compared to a perfect sphere. Thus, the different tracks at different locations on the sphere may have a different profile in order to maintain a constant clearance from the surface of the spherical lens.

The vertical arcs may be symmetrical about a center 2-polarized radiator 112, but this is not required, and an unsymmetrical, aka asymmetrical, path may be required to compensate for reflections, fading, and interference in order to fill the desired geometric footprint of a cell. Control mechanisms 151, 152, 153 usually have motors with remote control. However, for some applications, motors are not required if the beams' tilt has been pre-set manually in a factory or in the field. In antenna system 100, lens antennas 101, 102 share the same control mechanisms 151, 152, 153. In FIG. 1B, all 12 antenna connector 131 are shown, from P11 to P34 (where the first index is a beam number, and the second index is a MIMO transceiver port number). Each of three beams of antenna system 100 can be tilted independently, i.e. for different angle. To provide the best MIMO performance, beams of the top and bottom lens antennas 101, 102 are tilted in the same direction. However, for some applications, if necessary, beams of the top and bottom lens antennas 101, 102 can be tilted in different directions. For example, this tilted difference can be vertical, horizontal, or oblique, with angles of tilt ranging from 1-5, 1-10, 5-20 degrees and beyond 20 degrees in different embodiments to compensate for interference, reflections, fading, mutual coupling/mutual pattern distortions, etc. While FIGS. 1A and 1B illustrate the present embodiment of three beams of HB (formed by radiator(s) in each of three subgroups of the left side 157-1, the right side 157-2, and the central subgroup), other embodiments can use a single HB beam or many more beams such as 20 to 30 beams or more, for very high density communication in a small geographical area, e.g., a crowded stadium event. Similarly, while later illustrations show a single low band (LB) beam, the present disclosure is applicable to antenna having multiple LB beams. Thus, in general, the frequency ratio between a LB to a MB and/or between a MB to a HB is usually 1:2 or 1:3, while other embodiments can utilize a ratio between a LB to a MB or a LB to a HB of 1:4 or higher, such as 1:10 or more. The ratio of the LB to the MB can be the same or different as the ratio of the MB to the HB in different embodiments. Resultantly, capacity shaping for a given cell is accomplished by scaling an active quantity of the plurality of subgroups for a given RF band. One embodiment accomplishes this by statically or dynamically changing a given quantity of active subgroups for a given RF band of radiators, each having a given beam width that together covers the cell. The quantity of active subgroups can be increased or reduced for the data capacity demanded or controlled for the cell. For example if the quantity of active subgroups is reduced for low traffic times and/or geographies by turning off, or placing on reduced standby power, some of the subgroups, then the remaining active subgroups can have beam tilt changed to increase beam width beam to still cover the cell, but with reduced power consumption.

Figure 2A:
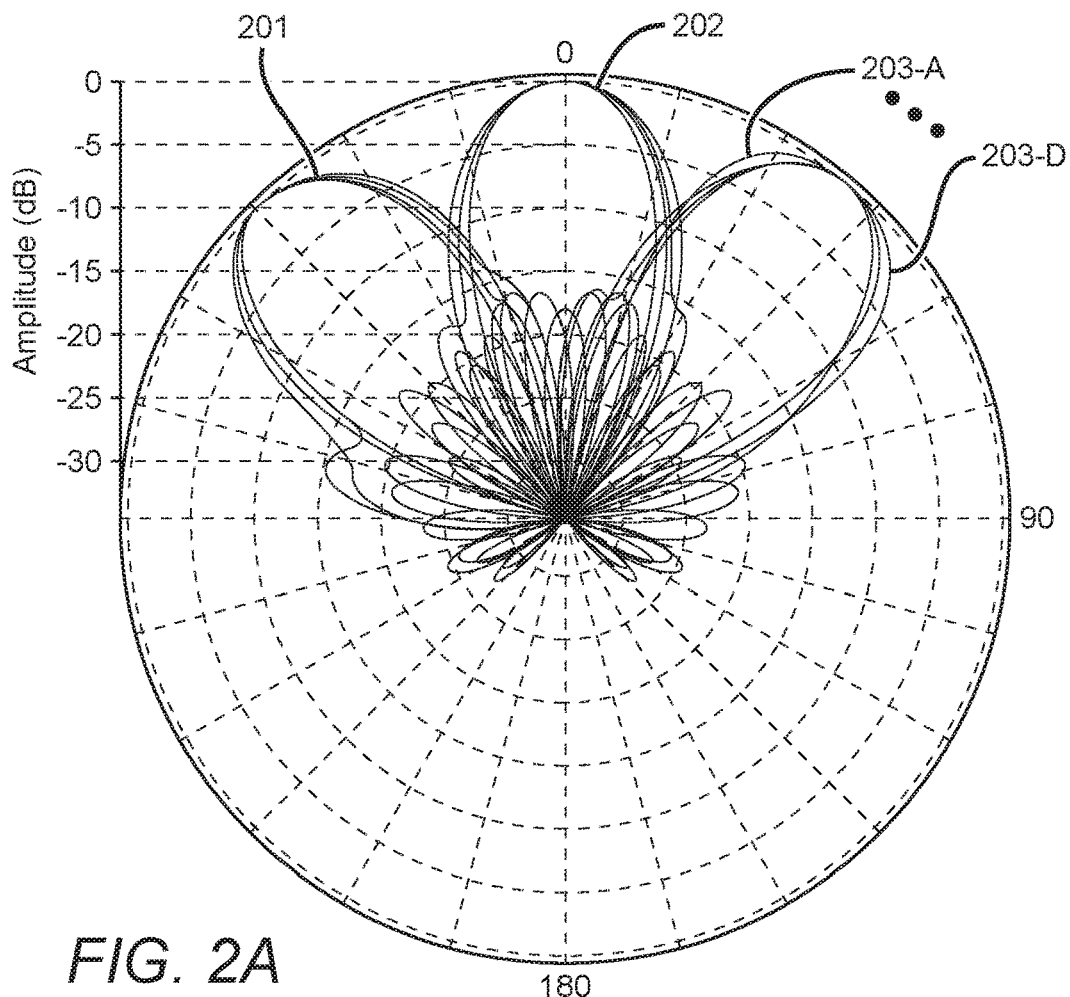
FIG. 2A is a polar chart of the 3-beam antenna system with 4×4 MIMO for each beam, showing co-polarized measured azimuth patterns of the antenna prototype at 1.7-2.7 GHz, according to one embodiment.
Figure 2B:
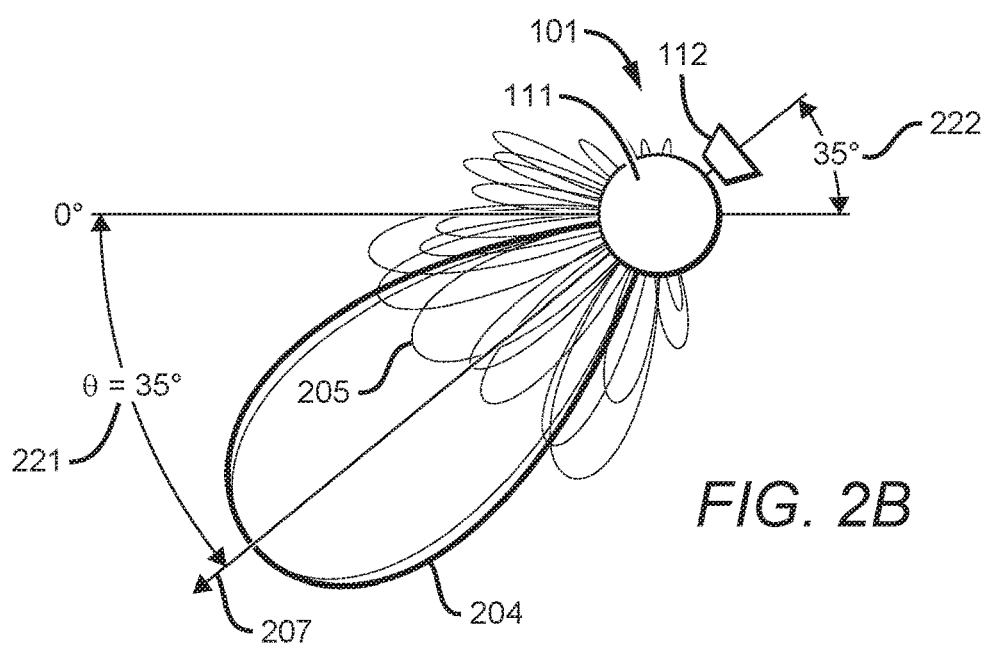
FIG. 2B is a side view of measured elevation co-polar and cross-polar patterns from a 3-beam antenna system with 4×4 MIMO for each beam, according to one embodiment.

To illustrate performance of a single antenna system 100, experimental data is shown in FIG. 2 series. Each of three beams are pointed to −40, 0, +40° azimuth directions to cover desired 120° sector, as one can see from the polar chart in FIG. 2A. Isolation between all antenna connectors 131 (total 12) of FIGS. 1A, 1B was measured >27 dB in wide frequency band 1.7-2.7 GHz for any combination of beam tilt, providing low correlation between all antenna connectors 131, namely ports P11-P34, required for MIMO processing. Co-polarized antenna patterns 201, 202, 203 measured in azimuth for 1.7-2.7 GHz are shown in FIG. 2A. They are covering 120° sector with stable beam width (23±2° in −3 dB level) and beam position and low level of azimuth sidelobes (<−20 dB typical) in very wide tilt range 0-40°. Low azimuth sidelobes, stable beam width, and low overlap (<10%) between beams benefit for low interference between one or more cells (inter-cell, e.g., 311a, 311b, 311c, etc.) sectors (intra-cell, e.g., 312, 313), important for LTE. Gain measured at 1.7-2.7 GHz is 18±1 dBi at all 12 antenna connectors 131 and all beam tilts (e.g., 0-40°) which is a good metric for this compact size (total 0.7 m height antenna system 100). Thus, the present embodiment accomplishes approximately a same gain at all antenna connectors in the antenna assembly 100, even with a high beam tilt. In FIG. 2B, co-polarized elevation beam 204 is shown (tilted by 35°), also with low sidelobes level (<−20 dB typical). Low upper elevation side lobe level is important for interference reduction between neighbor sites. Low cross-polarization 205 level (<−18 dB) is beneficial for polarization diversity, i.e. MIMO performance. In another embodiment, an extended frequency range 1.4-2.7 GHz also demonstrated positive pattern and port-to-port isolation results. A component HB beam from one of the three HB 2-polarized radiators 112 (on the left side of each lens antenna 111 of FIG. 1B, if looking from the back of the lens) combine to form the co-polarized (composite signal) antenna pattern 203 on the right side of the plot in FIG. 2A that is comprised of beams 203-A through 203-D that at least partially and that substantially overlap each other. That is, four beams 203-A to 203-D are formed from four channels of data transmitted on the four ports P11, P12, P13, and P14 to each of the two polarized radiators 112-1 and 112-2 on each of the lenses 101 and 102, respectively. Similarly, a component HB beam from HB 2-polarized radiators 112 on the center of each lens antenna 111 of FIG. 2A combine to form the co-polarized (composite signal) antenna pattern 204 on the center of the plot in FIG. 2B. Finally, a component HB beam from HB 2-polarized radiators 112 on the right side of each lens antenna 111 of FIG. 2A combine to form the co-polarized (composite signal) antenna pattern 201 on the left side of the plot in FIG. 2B. Similarly, component beams from a MB and a LB combine to form a co-polarized (composite signal) in a quantity of beams and shape as shown below in FIGS. 3A-3C, 8, 12C, 16B, and 17B.

FIG. 2B also schematically illustrates beam tilt positioning for spherical lens antenna 101. As shown in FIG. 2B, beam tilt angle 221 is equal to rotating angle 222 of 2-polarized radiator 112, which is pointed to the center of the spherical lens 111. In Butler matrix technology, high beam tilts can degrade antenna performance (e.g., with big upper side lobes, gain loss and main beam distortions), and tilt range is limited, because antenna is flat. In the present embodiment, beam characteristics of 40° tilt are approximately the same for an untilted beam, because lens is spherical and beam is not changing its shape with tilt. In a present embodiment, beam 204 has an axis-symmetrical radiation pattern, similar to an ideal raindrop shape, which is symmetrical for any cross-sections along the axis 207.

Figure 3A:
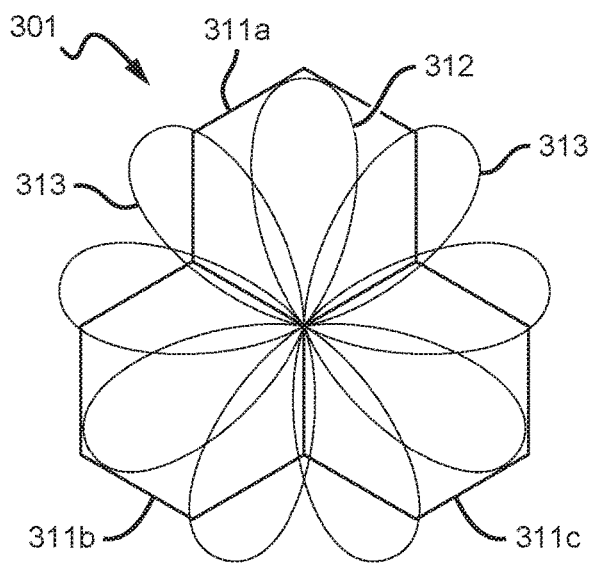
FIG. 3A is a three-hexagonal cell coverage illustration providing 360° coverage, with each-hexagonal cell coverage provided by a 3-beam antenna system with 4×4 MIMO for each beam, when all beams have the same downward tilt, according to one embodiment.

FIG. 3 presents a cell plan and sectorization resulting from one embodiment of antenna system 100, configured in a HB 3-beam embodiment. Hexagonal cell 311 is the most common in cellular communications, though the present disclosure works with many other configurations. Three of 3-beam antennas of antenna system 100 are required to cover 360°. FIG. 3A is an illustration of three-hexagonal cells that provides 360° coverage resulting from the three antennas when all nine beams (including central beam 312 and outer beams 313) have the same downward tilt, for the three hexagonal cells. Hence, all nine beams are approximately a same beam shape as each other, which is symmetrical about each beam's own centerline. Outer beams 313 are symmetric about a centerline of the center beam 312 for a given hexagonal cell; that is, the left outer beam and the right outer beam are symmetric with respect to the centerline of the center beam of a given hexagonal cell. To create this full symmetry pattern, HB radiators are typically aligned about a spherical lens in a same azimuth plane (not shown in figures), e.g., center radiator 112 would be at a same vertical height as left and right radiators 112 for each respective lens antenna 101, 102. This embodiment is good when uniform coverage is needed for special events and hot spots, but in multi-cell environment, as one can see from FIG. 3A, some beams 313 are overlapping to the adjacent cells, extending past borders of hexagonal cell 311, which can create interference in some cases. In one embodiment, the left outer, central, and right outer beams of FIG. 3A together cover at least 80% or more of a common geometric footprint area, namely a hexagonal cell.

Figure 3B:
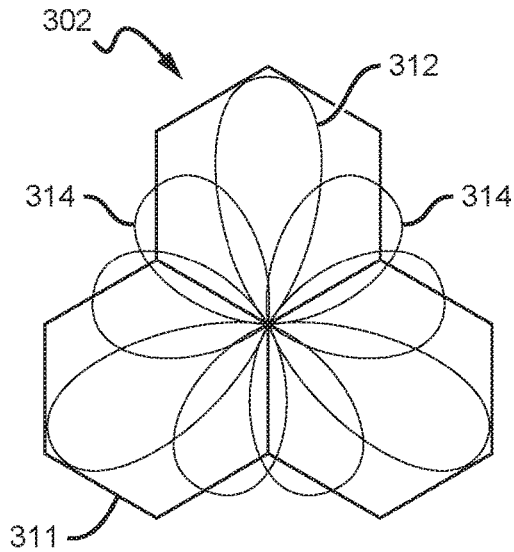
FIG. 3B is a three-hexagonal cell illustration providing 360° coverage, with each hexagonal cell coverage provided by a 3-beam antenna system with 4×4 MIMO for each beam, with some beams having a different tilt for less interference with other cells, according to one embodiment.
Figure 3C:
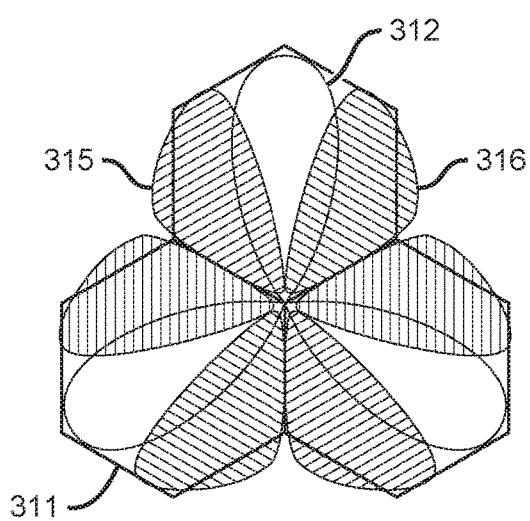
FIG. 3C is a three-hexagonal cell illustration providing 360° coverage, with each hexagonal cell coverage provided by a 3-beam antenna system with 4×4 MIMO for each beam, when asymmetrical beams are used for outer beams, for less interference with other cells, according to one embodiment.

Referring now to FIG. 3B, an illustration is shown of three-hexagonal cells providing 360° coverage, with each hexagonal cell coverage from a 3-beam antenna system with 4×4 MIMO for each beam, with some beams having a different tilt to reduce interference with other cells. For an LTE network, reduction of interference between cells is especially important. For better cell coverage and less interference with adjacent sectors/cells, outer beams 314 of each 3-beam antenna can be tilted more than central beam 312, to place all beams inside cell borders 311, as shown in FIG. 3B. Both outer beams 314 are formed with radiators having a same downward tilt, in one embodiment, which is greater than a tilt for radiators for a central beam, e.g., as shown in FIG. 1B. For example, if central beam 312 has 20° beam tilt, outer beams 313 need to set with about 30° for cell coverage optimization. Locations of the 2-polarized radiators 112 against spherical lens 111 as shown in FIG. 1B is required for cell coverage 302 in the present figure. In one embodiment, the left outer, central, and right outer beams of FIG. 3B together cover 80% or more of a common geometric footprint area, namely a hexagonal cell. In FIG. 3B, the three beams for the hexagonal cell are not the same as each other, but are different sizes, with the left and right outer beams being approximately a same size as each other, and being symmetrical with respect to a centerline of the center beam, and symmetrical about a centerline of the individual beam itself but having a different size than the center beam. Subsequent embodiments will illustrate where left and right outer beams have an asymmetric beam shape (about a centerline of the beam itself, as shown in FIGS. 3C and 12C). Thus, FIG. 3B shows symmetric but different sized beams' footprints; that is, the left outer beam and the right outer beam are symmetric with respect to each other. For the three hexagonal cells shown, there are nine beams that are symmetrical from cell to cell (the center beams being consistent in size and shape to each other, and the right outer beams being consistent in size and shape, and the left outer beams being consistent in size and shape).

Different combinations of embodiments from FIGS. 3A and 3B can be utilized for different hexagonal cells, depending upon the application, to form a hybrid asymmetric combination of transmission for different hexagonal cells. For example, where more power is desired in one hexagonal cell with less concern for interference from a beam projecting beyond the boundary of the hexagonal cell, a pattern like that shown in FIG. 3A can be used for a given hexagonal cell, while the other two hexagonal cells in the three cell arrangement shown can utilize the pattern shown in FIG. 3B. In another embodiment, each of the plurality of 2-polarized radiators 112 of FIG. 1B can be independently tilted to provide a unique cell coverage necessitated by geography or interference conditions. In this latter embodiment, outer beams 314 of each 3-beam antenna can be tilted independently from each other and from the central beam 312, resulting in beam shapes that are inconsistent in size, shape, and symmetry with itself (e.g., about its own axis) and with each of the other beams in the cell. That is, each outer 2-polarized radiator 112 is located in a different azimuth plane from each other, with all three radiators for a given spherical lens at different azimuth locations with respect to each other in order to create beams 312, 313, and 314 that all have different shapes from each other (e.g., tilt beam for the left 314 in 3B to make it smaller than the right 314). Applications benefiting from this beam shaping include natural terrain variations (hills, valleys, etc.), man-made obstructions (buildings, other RF sources, reflections, deep Rayleigh fading, etc.), man-made applications (sports stadiums, skyscrapers, etc.) that require special independent shaping of beams. Separate and independent control mechanisms 151, 152, 153 and mechanical linkages 161 enable each of the 2-polarized radiators 112 (left, center, and right) of FIG. 1B to be moved along tracks 141 to enable matched, or unmatched tilt angles for two or more 2-polarized radiators 112 (with any combination permitted).

Referring now to FIG. 3C, an illustration is shown of three-hexagonal cells providing 360° coverage, with each hexagonal cell coverage provided by a 3-beam antenna system with 4×4 MIMO for each beam and with asymmetrical beams used for outer beams for less interference with other cells. This embodiment uses an asymmetrical pattern (in the azimuth plane) for outer beams 315, 316 and symmetrical pattern (in the azimuth plane) for central beam 312, which allows for further improvement of cell coverage with 3-beam embodiment of antenna system 100, with less gaps between beams (for better coverage of assigned cell) and less overlapping to neighbor cells (for less interference). In one embodiment, two outer asymmetrical beams 315, 316 are mirror images of, or symmetrical to, each other, per a centerline of the center beam 312 (i.e. centerline of the cell), as shown in FIG. 3C. However, asymmetrical beams 315 and 316 are asymmetrical about their own beam centerline. Asymmetrical beam 315, 316 can be achieved by pointing 2-polarized radiator 112 offset from center point (in azimuth plane) of spherical lens 111, i.e., aligning a radiator 112 to a given spherical lens in a manner other than through a center of the lens 111. Combination of different tilt for outer beams compared to central beam (as described above) and offsetting of 2-polarized radiator from the center of the spherical lens can be used in another embodiment. Other methods of creating asymmetrical beams are discussed below.

The 3-beam embodiment of antenna system 100 (which has 2 times wider tilt range compare to the best existing base station antennas) allows much better cell coverage optimization compared to other attempted solutions. Indeed, with antennas of other attempted solutions (based on Butler matrix), due to heavy internal coupling, the independent beam tilt of each beam is not achievable. Therefore, efficient cell planning shown in FIGS. 3B and 3C is impossible with other attempted solutions. In contrast with other attempted solutions, antenna system 100 allows truly independent tilt for each beam, and high tilt differences between beams (up to 40°) is achievable, which is beneficial for cell coverage optimization and for flexibility of cell planning. Even if other attempted solutions used three separate existing panel antennas with orientations in −40, 0, +40°, achieving cell planning of FIGS. 3B and 3C, would be very difficult, because the best conventional antennas have 2-4 times less tilt range compared to antenna system 100. In addition, antenna system 100 is approximately one-third the size of other attempted solutions by replacing three separate 4×4 MIMO antennas, each oriented in one three different directions for 360° coverage.

Figure 4:
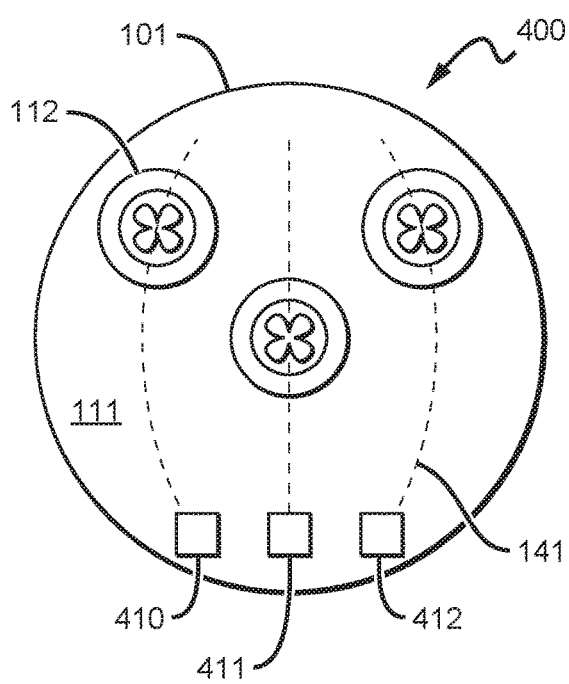
FIG. 4 is a 3-beam spherical lens antenna with 2×2 MIMO for each beam, according to one embodiment.

In FIG. 4, a 3-beam spherical lens antenna 400 is schematically shown in one embodiment. It is similar to spherical lens antennas 101, 102 in antenna system 100 of FIG. 1B but has its own control mechanisms 410, 411, 412, not shared with other lens antennas as shown for antenna system 100. The location of radiators 112 is shown when two outer beams have more tilt compare to central beam, which is beneficial for cell coverage as described above. A single 3-beam spherical lens antenna 400 can be used as an independent 2×2 MIMO antenna or as a building block for more complicated antenna systems, in particular for higher order MIMO embodiments. In other embodiments, the 3-beam spherical lens antenna 400 can be placed very close, or proximate, to each other. Some or all lenses can be touching each other, or can be within zero to approximately 0.25 LB or HB wavelengths gap of each other in one embodiment, and greater than 0.25 wavelengths in another embodiment, or can be overlapping slightly in front of each other when viewed from the side, with the overlap ranging of 0-25% of the larger spherical lens diameter, and still having good radiation patterns and good port-to-port isolation (>25 dB) between all ports. A gap between lenses can provide space for placement of a dipole element of a different band or for tracks for a radiator. Close spatial location of lenses reduces sidelobe levels in the same embodiments.

Figure 5A:
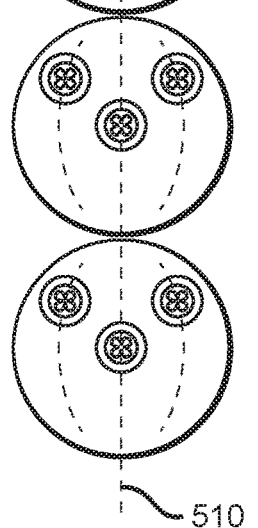
FIG. 5A is a back view of a 3-beam antenna system with 8×8 MIMO for each beam (vertical arrangement), according to one embodiment.
Figure 5C:
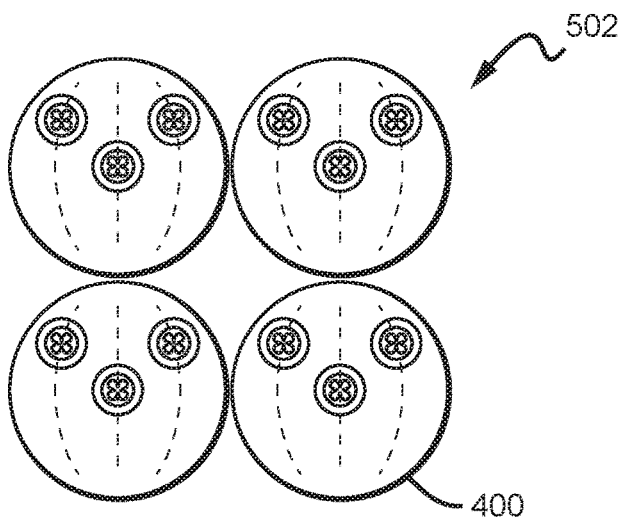
FIG. 5C illustrates a 3-beam antenna system with 8×8 MIMO for each beam (square arrangement), according to one embodiment.
Figure 5D:
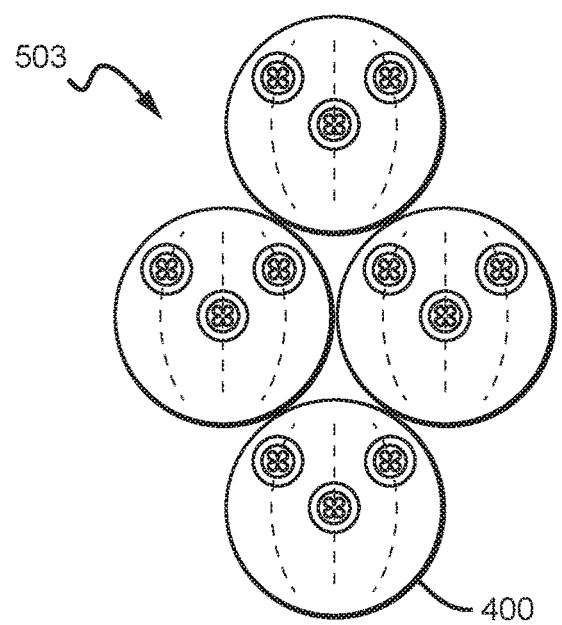
FIG. 5D illustrates a 3-beam antenna system with 8×8 MIMO for each beam (diamond arrangement), according to one embodiment.
Figure 5B:
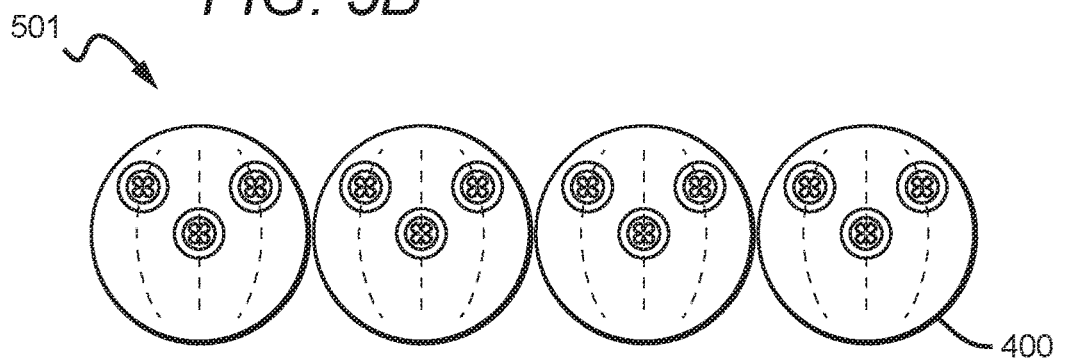
FIG. 5B illustrates a 3-beam antenna system with 8×8 MIMO for each beam (horizontal arrangement), according to one embodiment.
Figure 6A:
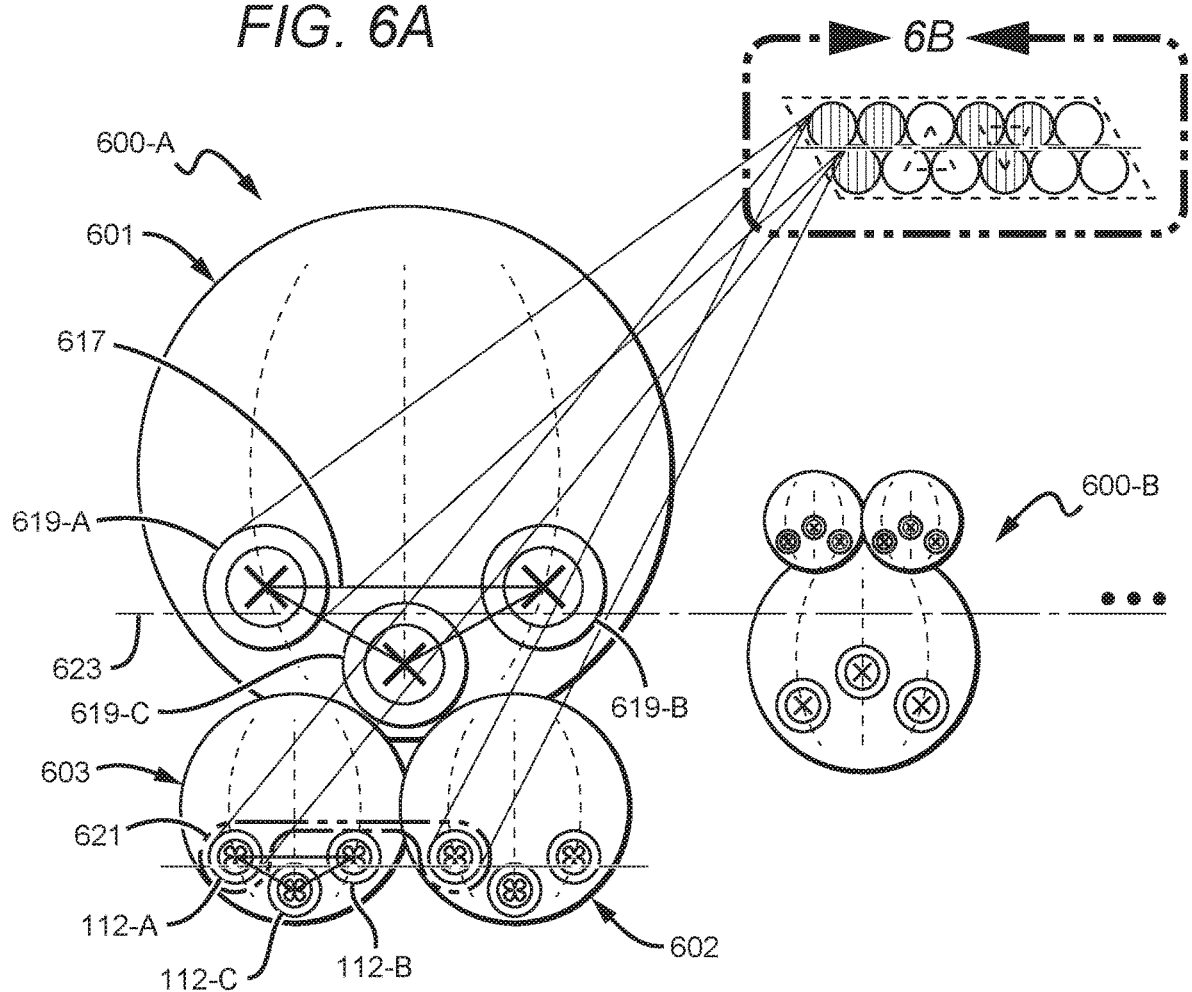
FIG. 6A illustrates a 3-beam 2-band antenna system (4×4 MIMO for HB and 2×2 MIMO for LB), according to one embodiment.

In FIGS. 5A-5D, several embodiments of an 8×8 MIMO antenna systems (with 24 antenna connectors 131 for each) are illustrated, based on 3-beam spherical lens antenna 400, which is used as the building block (control mechanisms are not shown in FIGS. 5A-5D for simplicity). The vertical arrangement 500 shown in FIG. 5A is a traditional embodiment for base station antennas for tower mounting (with all the spherical lenses disposed on a same vertical centerline 510 in a same vertical plane). However, sometimes a horizontal configuration 501 (with the spherical lenses disposed along a line in the same horizontal plane) can be a more appropriate embodiment, as shown in FIG. 5B, for when an antenna is mounted on a roof edge. Another embodiment can also be defined by zoning requirements (for example, placing antenna in square window necessitating the four spherical lens antennas disposed in a square configuration 502 in a same plane, as shown in FIG. 5C, or alternatively in a rectangular configuration in a same plane), or by the best MIMO performance which depends on multi-path signal propagation conditions. Other embodiments, such as a symmetrical or asymmetrical diamond arrangement 503 (in a same plane, with the former shown in FIG. 5D) also can be utilized. Arbitrary arrangement of the 3-beam spherical lens antenna 400 for 8×8 MIMO antenna system is possible because isolation between all ports (total 24 ports) is good (>25 dB) even with tight co-locations of "building blocks", which allow great flexibility in the site deployment. Thus, an arbitrary arrangement of the 3-beam spherical lens antenna 400 can be asymmetric polygonal shape, non-linear, etc. to tailor beam formation for a given target area with special needs for the cell or for the beam shape, etc. Combinations of these different geometric shapes can yield a triangular embodiment such as shown in FIG. 6A, a curvilinear array, etc. Note that a 6×6 MIMO antenna system embodiment (not shown) is created by dropping one of the three 3-beam spherical lens antenna 400 from one of the arrangements shown, e.g., FIGS. 5A and 5B. FIGS. 5B, 5C, and 5D can all be implemented with multiple RF bands as well by adapting multi-band lens antennas described below into the present unique geometries.

In FIG. 6-FIG. 16, several dual-band embodiments, HB+LB, based on spherical antenna technology are shown.

Referring now to n FIG. 6A, a 3-beam antenna system 600 for 4×4 HB MIMO and 2×2 LB MIMO is shown according to one or more embodiments. A total number of antenna connectors is 18 (not shown in FIG. 6A), implemented by 6 LB and 12 HB connectors. For compact arrangement, LB lens antenna 601 and HB lens antennas 602, 603 are placed close to each other in the present embodiment (can be touching or even slightly overlapped from a front or back view in different embodiments). From a side view (now shown), the HB lens antennas 602, 603 are offset, or located behind LB lens antenna 601 for one embodiment having a downward beam tilt, so as to avoid the HB lens antenna 602, 603 being in the path of a beam from the LB antenna. In this embodiment, a center point of the lenses of the HB and LB lens antennas are not required to be in a same vertical plane, but rather can be in a plane that is angled. For the embodiment shown, with an upward beam tilt (from an antenna system projecting up to elevated stadium/tribune sections), HB lens antennas 602, 603 can be alternatively offset in front of LB lens antenna 601, i.e., in the direction the beam is pointing, for a similar purpose of avoiding LB lens antenna 601 obstructing beam transmission from HB lens antennas 602, 603, especially for high beam tilt. The HB lens antennas 602, 603 are located in one axis (horizontal in the present embodiment, but other than horizontal axis in another embodiment). To further compact the antenna system, one or more of the spherical lenses can be altered from its spherical shape to promote a tighter and smaller assembly, e.g., the top or bottom of one or more lens can be flattened, or a lens can have a conformal pocket, such as lens 601 having a spherical pocket into which smaller spherical lens 602 and/or 603 can fit. This compaction of the lens assembly retains the individual benefits and properties of good radiation patterns and good port-to-port isolation (>25 dB) between all ports. The LB lens antenna 601 and HB lens antennas 602, 603 are configured to have approximately the same beam width to provide the same coverage in this embodiment. The spherical lenses in LB lens antenna 601 and in HB lens antennas 602 and 603 are arranged in a triangular configuration (centers of the spheres) in the present embodiment. The 3-beam antenna system 600 can be used for hexagonal cell coverage, as shown in FIG. 3 for different scenarios. The 2 HB lens antennas 602 and 603 are disposed on a straight line, while the LB lens antenna 601 is disposed close by, adjacent, touching, or overlapping in different embodiments.

Beam projection from HB radiators 112-A, 112-B, and 112-C for each of the two HB lens antenna 602 and 603 form each of the respective triangle beam co-locations for 604-A, 604-B, 604-C, respectively. The beams projected from a given position of radiator 112-A of both lens antenna 602, and 603, i.e., subgroup 621 of HB radiators, overlap on the given target 604-A, as shown by the dashed lines. Likewise, beam projection from LB radiators 619-A, 619-B, and 619-C for the single LB lens antenna 601 also form each of the respective triangle beam co-locations for 604-A, 604-B, and 604-C, respectively. Replicated 3-beam antenna system 600-B, (shown in reduced scale for clarity) with inverted arrangement of LB lens antenna 601 and HB lens antennas 602 and 603 to provide the next inverted triangle beam co-location 605, and so forth, to form a two-dimensional matrix of antenna. This pattern is repeated in one or more dimensions in other embodiments for an interlaced pattern antenna assemblies 600-A, 600-B, etc. aligned along an axis 623, with each antenna assembly having HB and LB lens antennas, to create beams for a desired coverage area, e.g., pattern 606 with target axis 625.

Figure 6B:
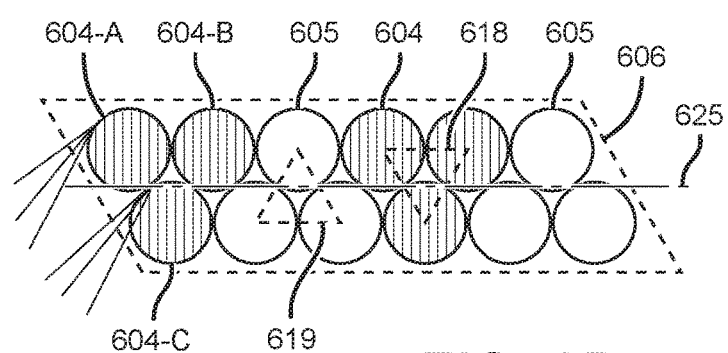
FIG. 6B schematically shows an example of stadium tribune coverage with 3-beam antennas of FIG. 6A, according to one embodiment.

The 3-beam antenna system 600-A with triangle beam co-location (grouping) is an effective solution for stadium, or tribune, coverage in one embodiment. FIG. 6B shows an example of stadium coverage by 3-beam antenna system 600 having the multiple 3-beam embodiment. In this embodiment, as shown in FIG. 6B, 3-beam antenna system 600 with triangle beam co-location 604 (shown with lined pattern) have greater beam tilt for its central beam compared to outer beams, and antennas with triangle beam co-location 605 have central beam tilted less than outer beams. Together, the different triangle beam co-locations 604 and 605 provide continuous coverage for stadium tribune pattern 606, as schematically shown in FIG. 6B. The stadium tribune coverage is shown as a parallelogram in the present embodiment. In addition, the pattern represents a footprint, e.g., three circular geometric footprints, that is projected on a surface that is at least partially in a third dimension of a vertical axis as when an arena or stadium is densely filled with users in upper and lower levels that are using their mobile devices. This as opposed to users and mobile devices constrained to a 2-dimension planer terrestrial location. Another embodiment can rotate parallelogram pattern 606 sideways for a vertical distribution coverage, such as for a densely populated skyscraper.

The number of antennas with different triangle beam co-locations 604 and 605 is about the same, as shown in FIG. 6B (same quantity being two 604 triangle beam co-locations and two 605-triangle beam co-locations). For an optimal coverage embodiment (with minimal gaps between beams) the following conditions are used: a) −10 dB beam width is 60'; b) centers of 2-polarized radiators in each of LB lens antenna 601, and HB lens antennas 602, 603 are located in equilateral triangle 617; c) azimuth positions of beams are −30, 0, +30°; d) beam tilt difference between central and outer beams is 52°, as shown in a subsequent figure. This large tilt angle difference is not achievable with other attempted solutions. Said differently, for stadium tribune pattern 606 coverage, half the antennas forming a triangular layout 618 have a beam triangle with a vertex oriented down and the another half of the antennas forming a triangular layout 619 have a beam triangle with a vertex oriented up, and interleaved together forming a parallelogram area coverage 606. Different sized lenses in antennas 601 versus 602 and 603 allow for more compact arrangement of the hardware, and higher density antenna systems.

Figure 6C:
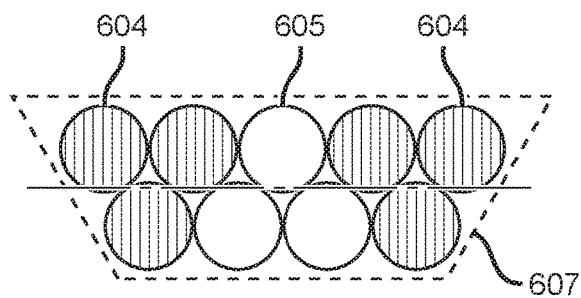
FIG. 6C schematically shows an example of stadium trapezoid coverage with 3-beam antennas of FIG. 6A, according to one embodiment.

In another embodiment, a wide variety of shapes can be covered, such as a trapezoidal shape, or a keystone shape 607, as shown in FIG. 6C. Thus, patterns can be formed by the beam co-location in order to satisfy a given seating layout in a 3-dimensional curved or linear arena, stadium, or grandstand seating arrangements. In keystone shape 607, a different quantity of antenna patterns are used, with two 604 triangle beam co-locations and only one 605 triangle beam co-location. These different desired patterns depend on the angle and position of the 3-beam antenna system in relation to the portion of the stadium floor, lower bowl and/or upper bowl desired to be covered. With the present system, radiators can be selectively powered, for different times, different conditions, and different desired shapes of beam patterns.

Figure 6D:
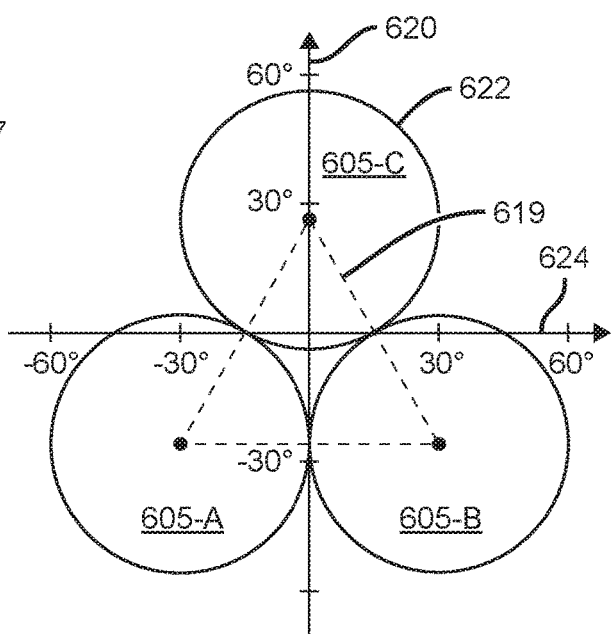
FIG. 6D is a graph of the beam centers and −10 dB beam contour for three of the 2-polarized radiators used to provide stadium tribune coverage, according to one embodiment.

Referring now to FIG. 6D, a graph is shown of the beam centers and −10 dB beam contour 622 for three of the 2-polarized radiators 112 of FIG. 6A used to provide stadium tribune coverage, according to one embodiment. Beams 605-A, 605-B, and 605-C correspond to the triangular beam co-location 605 in FIGS. 6B and 6C. Ordinate 620 is the elevation in degrees, while the abscissa 624 is the azimuth in degrees. Triangle 619 is equilateral in order to allow a duplicate copy of this three-beam pattern to be inverted and laterally offset in order to provide a continuous strip of coverage for a stadium, or other special application, whose coverage illustrated in FIGS. 6B and 6C. This arrangement is one embodiment to provide efficient coverage of a stadium application of antenna system (with minimal gaps between beams).

Figures 7B, 7C:
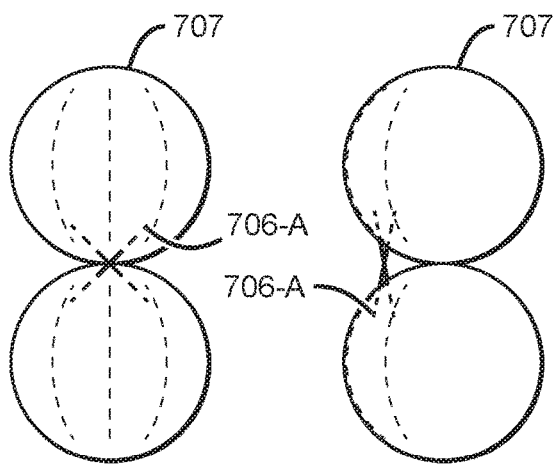
FIGS. 7B and 7C show a back view and a side view, respectively, of a portion of antenna system from FIG. 7A, where ends of LB crossed dipole partially penetrate into spherical lens, according to one embodiment.
Figures 7D, 7E:
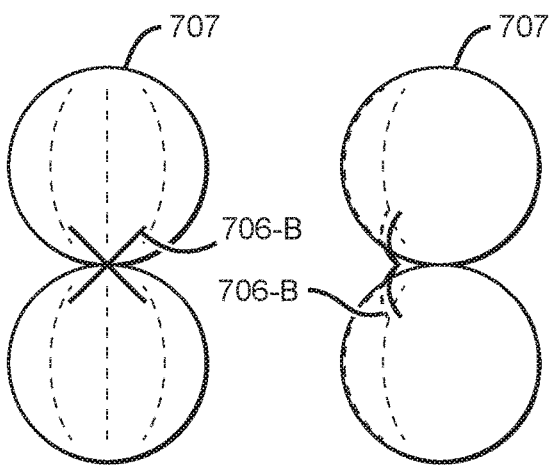
FIGS. 7D and 7E show a back view and a side view, respectively, of a portion of antenna system from FIG. 7A, where ends of LB crossed dipole bend to conform around spherical lens, according to one embodiment.
Figure 7A:
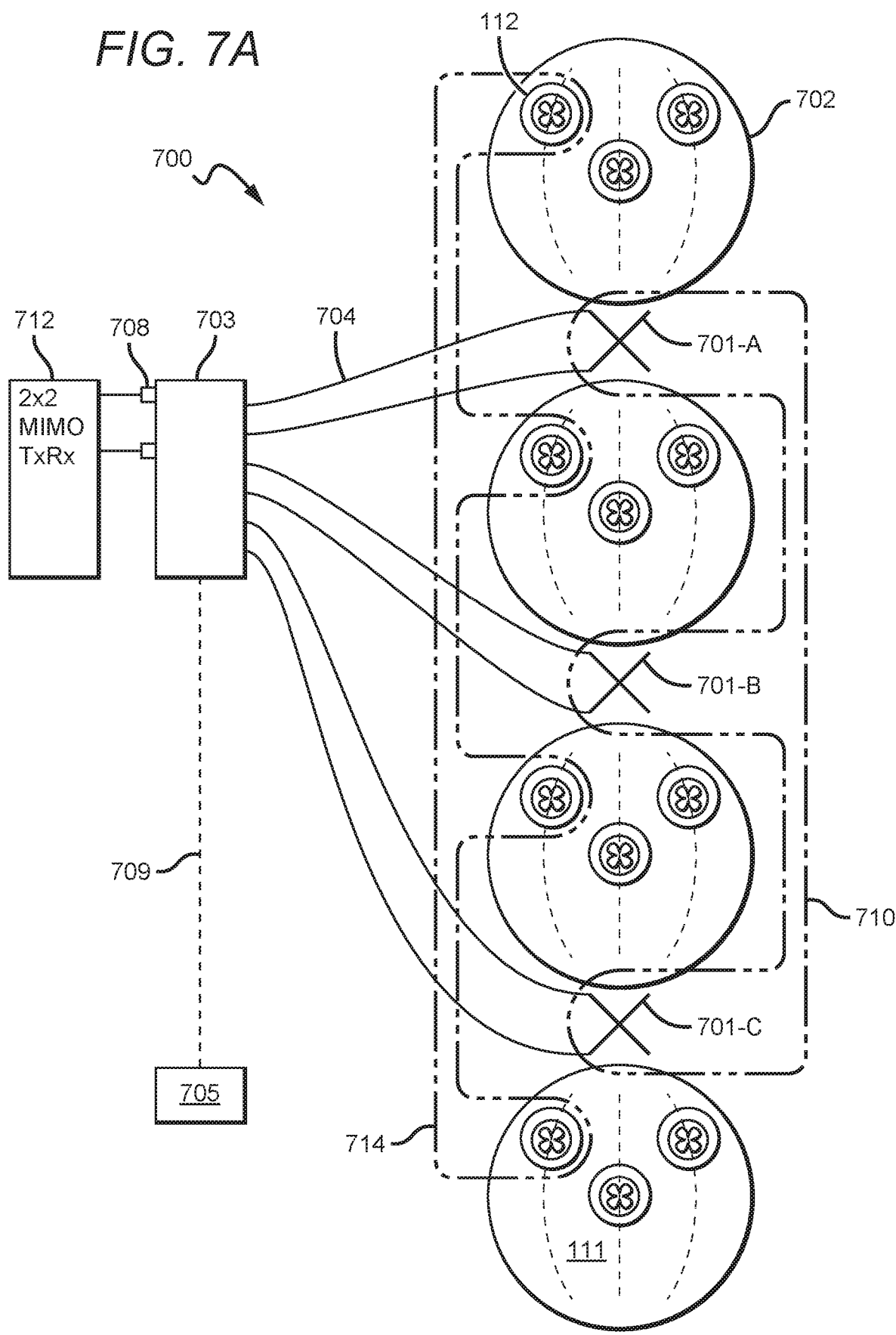
FIG. 7A illustrates proposed 2-band antenna system with three HB beams with 8×8 MIMO for each HB beam and one LB beam with 2×2 MIMO, where elements of LB crossed dipole are located between spherical lenses, according to one embodiment.

In FIG. 7A, a 2-band antenna system 700 is shown, in one embodiment, with 8×8 HB MIMO for each of three HB beam and 2×2 LB MIMO for one LB beam. The LB Elements 701 are a crossed dipole, are fixed (immovable), and are located between HB spherical lens antennas 702 (702 is analogous to 400) in the present embodiment. However, in another embodiment, the LB elements 701 are half-wave crossed dipoles. The LB elements 701 are grouped together in subgroup 710 out of the superset for radiators because they all transmit in the LB. The individual LB elements are shown in different embodiments of: i) LB element 701-A offset from adjacent lenses 111, ii) LB element 701-B in physical contact with (touching) adjacent lenses, and iii) LB element inserted into adjacent lenses 111. The LB elements 701-A for system 700 can either all be symmetrically embedded a same amount into lenses 111, or can be individually configured in any asymmetric combination of the three gap/contact/insertion embodiments above. These different embodiments of placement of LB elements provide one or more benefits of i) compacting assembly 700, ii) creating a desired shape pattern of a resulting beam/multi-beam on the geographical area, and iii) minimizing interference from other radiators in different bands. The LB beam tilt is provided by LB phase shifter 703, which provides beam tilt for a combined LB beam from subgroup 710 of the plurality of radiators. LB phase shifter 703 is connected to all LB elements 701 in subgroup 710 by RF cables 704. Arc phase shifter (see, for example, U.S. Pat. No. 7,907,096 entitled "Phase Shifter and Antenna Including Phase Shifter") or linear phase shifter (see, for example, U.S. Pat. No. 7,026,889, entitled "Adjustable Antenna Feed Network with Integrated Phase Shifter") can be used for LB phase shifter 703. One embodiment uses mechanical phase shifters, with the most common being linear (with linear motion of dielectric body, examples are U.S. Pat. Nos. 6,906,666, 7,196,674) and rotational (examples are U.S. Pat. Nos. 6,850,130 and 7,463,190). The LB phase shifter 703 is controlled by control mechanism 705 (which can have motor with electronic control circuits) through mechanical linkage 709. The antenna system 700 has a total of 26 antenna connectors, with 24 HB and 2 LB connectors (for simplicity, only 2 LB connectors 708 are shown in FIG. 7A). The LB beam tilt is independent to HB tilt.

The LB elements 701 configured as non-movable LB crossed dipoles can be mechanically pre-tilted down for better tilt range. The LB Elements 701 configured as crossed dipoles are generally placed between the spherical lenses in a vertical array, but are situated slightly behind the vertical centerline of the spherical lenses to allow at least a portion of the two spherical lenses to focus beams originating from the LB elements 701. As used herein, non-movable, or fixed, elements are elements that are fixed in place using an adhesive or a fixed, mechanical connector (i.e. a nail or a screw) and cannot be moved without tools. In other words, fixed elements are not mounted on a track or a hinge. Phase shifter 703 is coupled to 2×2 MIMO transceiver 712. In addition, HB elements 112 aligned on the left side of the centerline of the array of antennas 702 are grouped into a subgroup 714 because they all belong to the HB band.

In another two-antenna embodiment, shown in FIG. 7B, ends 706-A of LB dipole 701 partially penetrate to spherical lens 707, shown from the back. For both the cases shown in FIG. 7A (back view) and FIG. 7B, lenses 702 and 707 make LB beam about 1.4 times narrower in azimuth plane (to 50-60°, compare to about 75° of dipole without lens) which benefits sector coverage and reduces RF interference with other sectors. HB azimuth and elevation patterns (HB omitted from FIGS. 7B-7C for clarity) are similar to those shown in FIGS. 2A-2B. To provide similar cell coverage with three HB beams, the LB elevation beam width can be selected to be close to the HB beam width (by selecting of LB amplitude taper in LB phase shifter 703 and number of LB elements 701) in one embodiment. FIG. 7C is a slightly skewed side view of FIG. 7B, to show the at least partial penetration into the lens. Both ends of both dipoles 706-A are dashed in both FIGS. 7B and 7C to illustrate that at least a portion of dipoles 706-A are disposed inside lenses 707. In different embodiments, different amounts of the ends of dipoles 706-A are disposed inside lenses 707, either symmetrically, or asymmetrically, for beam shaping purposes.

Referring now to FIGS. 7D and 7E, a back view and a side view is shown, respectively, of a portion of antenna system from FIG. 7A, where ends of LB crossed dipole 706-B are bent to conform around spherical lenses 707 (instead of penetrating into lenses 707), according to one embodiment. That is, LB elements 706-B are configured as dipoles that conform to a shape of the spherical lens, i.e., the arms are bent around the outer surface of the lens, to avoid mechanical interference with, and to fit around a shape of, spherical lenses 707, while providing compact spacing between spherical lenses 707. Although this application of dipole 706-B is not aligned like that of a HB radiator to radiate through a center of a spherical lens, the proximity of the dipole to the spherical lens is sufficient to benefit from the lens shaping of the beam, e.g., shaping the beam from the conformal dipole from a baseline of 90 degrees to a lens application of 60 degrees in the azimuth beam width. Thus, a conformal dipole to a lens provides approximately 50-70% the same performance as a dipole aligned to a dedicated spherical lens, e.g., a HB dipole. Vertical compression of the beam from the conformal dipole is provided by a phase shifter in the present embodiment.

Figure 8:
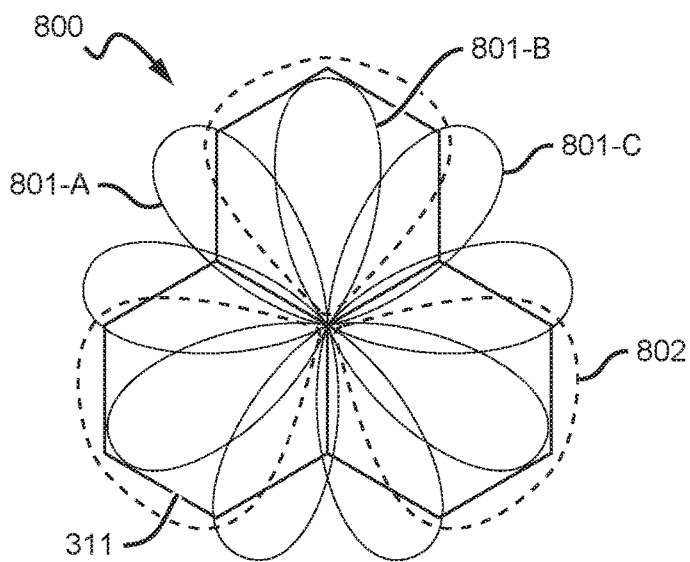
FIG. 8 is a three-hexagonal cell illustration providing 360° coverage, with each hexagonal cell coverage provided by a 2-band antenna system with three HB beams and one LB beam, according to one embodiment.

FIG. 8 shows hexagonal cell coverage 800 for three antenna systems 700 (one for each hexagonal cell), where three HB beams 801 (801-A, 801-B, 801-C) and one LB beam 802 and are covering the same hexagonal cell 311. The coverage illustrated in FIG. 8 is for three cells 311 to provide 360° worth of coverage. This is accomplished using three antenna systems of FIG. 7 mounted on a same tower, with low overlapping interference of beams between cells 311 as shown. Each HB beam 801-A, 801-B, and 801-C has a similar pattern to each other in the present embodiment. But at least one of the HB beams 801-A, 801-B, and 801-C is different from, and at least partially overlap, an LB beam 802. All HB beams 801 are shown with the same tilt, while the tilt of LB beam 802 is adjusted to cover cell 311. The HB beams 801 have a different pattern than that of the LB beams 802, even though there is at least some overlap between at least one of the HB beams 801 and the LB beam 802. The HB beams 801 and the LB beams 802 overlap each other substantially within the hexagonal cell 311 to provide effective communication for both bands in the hexagonal cell 311. A higher quantity of HB beams 801, a plurality of three in this embodiment, are used to provide coverage for the hexagonal cell 311 compared to the quantity of LB beams 802, one in the present embodiment. Different quantities of HB beams 801 and LB beams 802 can be utilized in other embodiments.

Figure 9A:
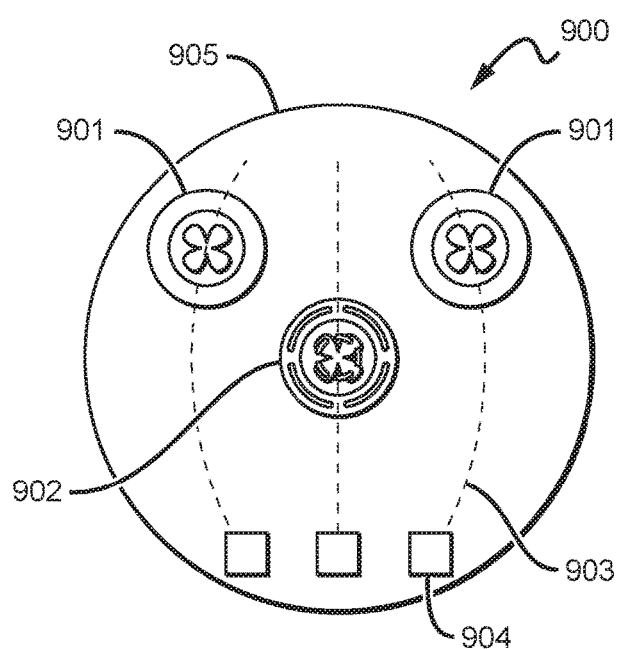
FIG. 9A is a 2-band lens antenna with three HB beams and one LB beam using 2-band 2-polarized radiator, as a building block for 2-band MIMO antenna systems, according to one embodiment.

FIG. 9A shows 2-band lens antenna 900 with cell coverage similar to 800, having two HB 2-polarized radiators 901, and one (central) 2-band 2-polarized radiator assembly 902, all of which are located on tracks 903 and can be moved by control mechanisms 904 around spherical lens 905. The 2-band lens antenna 900 is similar to the 3-beam spherical lens antenna 400, except the difference is in central 2-band 2-polarized radiator assembly 902. In one embodiment, HB is within 1.4-3.8 GHz, while LB is within 500-1000 MHz.

Figure 9B:
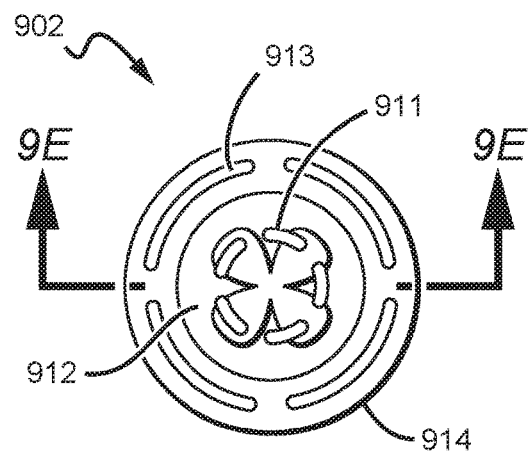
FIG. 9B is a 2-band 2-polarized radiator (top view), according to one embodiment.
Figure 9C:
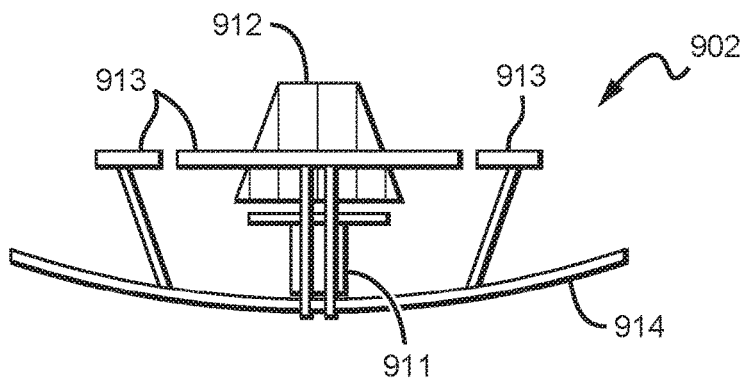
FIG. 9C is a side view of a 2-band 2-polarized radiating element, according to one embodiment.
Figure 9D:
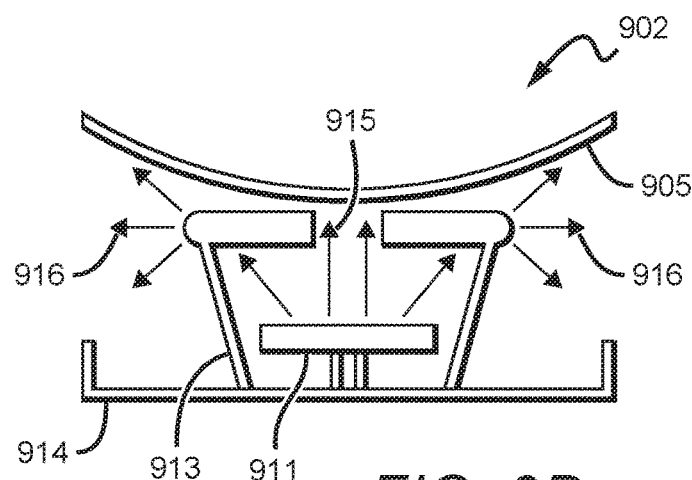
FIG. 9D is a side view of a 2-band 2-polarized radiating element without a secondary lens, superimposed with an electromagnetic field distribution, according to one embodiment.
Figure 9E:
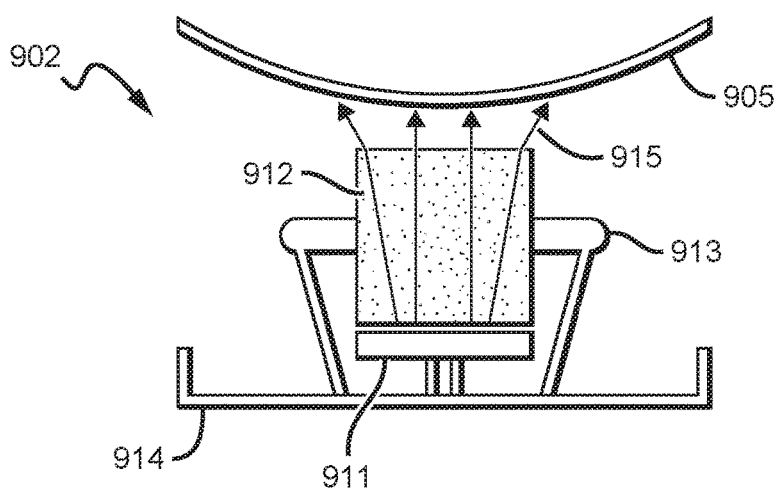
FIG. 9E is a side view of a 2-band 2-polarized radiating element with a secondary lens, superimposed with an electromagnetic field distribution, according to one embodiment.

In FIGS. 9B to 9E, one embodiment of 2-band 2-polarized radiator 902 is shown. It comprises four main components: HB element 911, secondary lens 912, LB element 913 and a movable common reflector 914. The LB radiator is comprised primarily of LB element 913, with support equipment coupling thereto. HB element 911 and LB element 913 are coaxially located on the movable common reflector 914, which has a substantially circular shape in one embodiment. As shown in FIGS. 9B and 9C, HB element 911, and/or secondary lens 912, is/are disposed proximate to each other, and specifically are "nested", concentrically configured, or "boxed in" LB element 913. LB element 913 is a boxed-dipole, which comprises 4 LB dipoles, bent to provide a substantially circular segmented arrangement, or shape, around HB element 911, as shown in FIG. 9B, in one embodiment. Alternative embodiments of LB element 913 include shaped elements to form a square pattern in lieu of a substantially circular shape. Section 9E-9E is shown in FIG. 9E for the secondary lens (and similarly shown in FIG. 9D, but without the secondary lens).

Figure 9F:
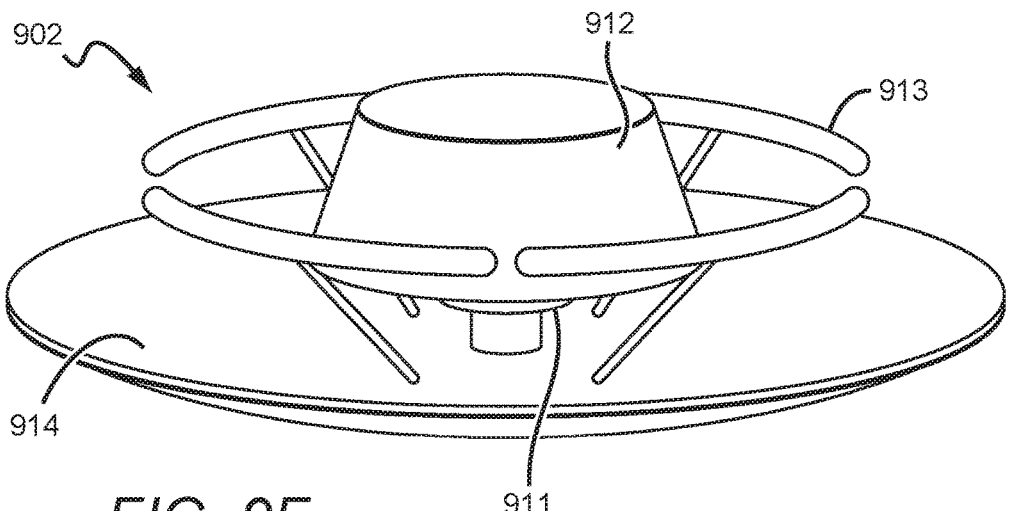
FIG. 9F is an isometric view 2-band 2-polarized radiating element with secondary lens, according to one embodiment.

Secondary lens 912 is made from dielectric material with dielectric constant 1.5-2.7 in one embodiment, 1.1 to 2.2, and 1.9 to 3.0 in other embodiments, and has 3 main functions: a) beam width stabilization of 2-band lens antenna 900 for HB; b) decreasing mutual coupling/mutual pattern distortions between HB element 911 and LB element 913; c) port-to-port isolation improvement between all antenna ports (which benefit for MIMO processing). A "coffee cup" shape embodiment of secondary lens is shown in FIG. 9C (a truncated cone) and cylindrical shape embodiment is shown in FIG. 9E, but other shapes also can be used, such as spherical or pyramidal shapes, in other embodiments. HB element 911 plus secondary lens 912 has: a) axis-symmetrical pattern, i.e. elevation and azimuth beam width should be the same; and b) significant linear frequency dependence of beam width vs. frequency. (For example, 3 dB beam width is changing from 65° at 1.7 GHz to 45° at 2.7 GHz). Also, as schematically illustrated in FIGS. 9D and 9E, secondary lens 912 helps to reduce interference of HB electromagnetic wave 915 (radiated by HB element 911) with nearby LB element 913, by reducing dissipated wave 916. (Arrows in FIGS. 9D and 9E show direction of propagation of electromagnetic wave 915 and dissipated wave 916.) Without secondary lens 912, significant portion of radiated wave 915 is re-radiated/dissipated in unwanted directions (shown as wave 916 in FIG. 9D). Secondary lens 912 concentrates HB electromagnetic wave 915 inside itself (see FIG. 9E), so, LB element 913 is not noticeably disturbing radiation pattern of HB element, and resulting HB radiation patterns of antenna 900 is about the same as without LB element 913, i.e., close to patterns of FIGS. 2A-2B. Secondary lens 912 also helps to make LB element 913 more compact, reducing its diameter. Compactness of LB element 913, as one can see from FIG. 9A, is needed to avoid mechanical interference of movable 2-band element 902 with two other movable elements 901. FIG. 9F is an isometric view 2-band 2-polarized radiating element with secondary lens, according to one embodiment.

LB element 913 originally (without spherical lens 905) has axis-symmetrical radiation patterns with half-power beam width of about 70°. With spherical lens 905, LB half-power beam width is 40-45°, as was measured in the 0.69-0.96 GHz frequency band. Cell coverage of 2-band lens antenna 900 is similar to that shown in FIG. 8.

Figure 10A:
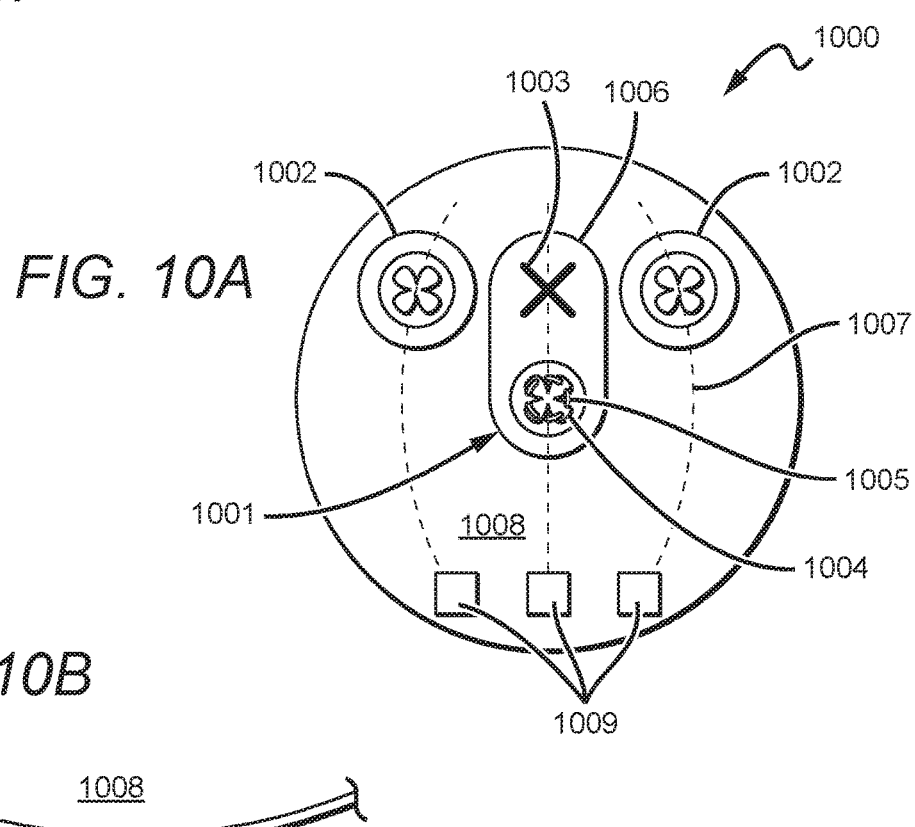
FIG. 10A is a spherical lens antenna with three HB beams and one LB beam with 2×2 MIMO for each beam, with HB element located side-by-side with LB element at the same central movable reflector, according to one embodiment.
Figure 10B:
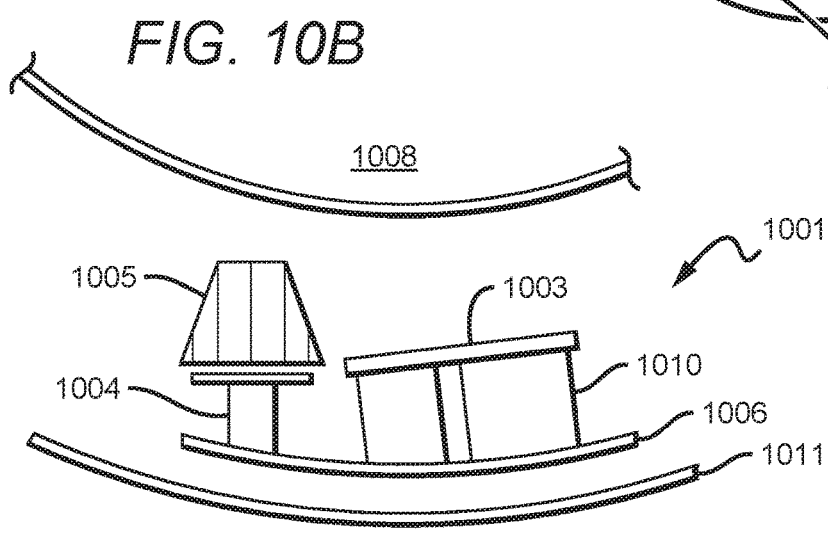
FIG. 10B is a side view of a HB/LB element assembly for lens antenna shown in FIG. 10A, according to one embodiment.

An embodiment of a 2-band lens antenna 1000 with cell coverage similar to 800 is shown in FIGS. 10A, 10B. It has one (central) HB/LB element assembly 1001 and two HB 2-polarized radiators 1002. The HB/LB element assembly 1001 includes an HB radiator that is primarily an HB element 1004 with a secondary lens 1005, and includes a nearby (adjacent to, proximate to, touching, or within several body widths of secondary lens 1005 to) LB radiator that is primarily an LB element 1003 which is a crossed dipole in the present embodiment, all located on a common reflector 1006, which is movable in one embodiment. The HB/LB element assembly 1001 and two HB 2-polarized radiators 1002 are located on tracks 1007 and can be moved independently around spherical lens 1008 by control mechanisms 1009, in one embodiment. Examples of crossed dipoles with axial-symmetrical radiation pattern (with the same beam width in azimuth and elevation planes) can be found, for example, in U.S. Pat. Nos. 6,747,606, 7,053,852. To reduce height and footprint of LB element 1003 configured as a crossed dipole, a dielectric filling 1010 (dielectric constant Dk=1.7-4) can be used, as shown in FIG. 10B. The LB element 1003 configured as a crossed dipole originally (without spherical lens) has axial-symmetrical radiation patterns with half-power beam width of about 90°. But with a spherical lens, the half-power beam width is transformed to approximately 50-60°, as was measured in the 0.69-0.96 GHz frequency band which provides good coverage for hexagonal cell, similar to the one LB beam 802 shown in FIG. 8. The HB azimuth and elevation patterns are very similar to those shown in FIG. 2. Secondary lens 1005 concentrates HB RF field inside it (similar as shown in FIG. 9E) and helps to reduce interference with nearby LB element, i.e. HB radiation pattern is about the same as without the LB element.

As one can see from FIGS. 9A and 10A, movable common reflectors 914, 1006 should be small enough to avoid mechanical interference with two movable HB 2-polarized radiators 901, 1002, respectively. In one embodiment, the area of common reflector 914, 1006 might not be enough to provide required front-to-back ratio for LB radiation pattern, and additional non-movable reflector 1011 can be placed behind (for example, with hemi-spherical shape as shown in FIG. 10B), large enough to provide required front-to-back ratio for LB radiation pattern.

In another embodiment, both LB element 1003, configured as a crossed dipole, and HB element 1004 can be placed on separate reflectors similar to 1006. In this case, additional control mechanism can be used for independent rotation of LB element 1003, configured as a crossed dipole, around spherical lens 1008.

Another embodiment of 2-band 2-polarized element can use different possible solution for co-location of HB and LB elements, where HB element is placed on the top of LB element. In this case, LB element plays role of reflector for HB element.

Figure 11A:
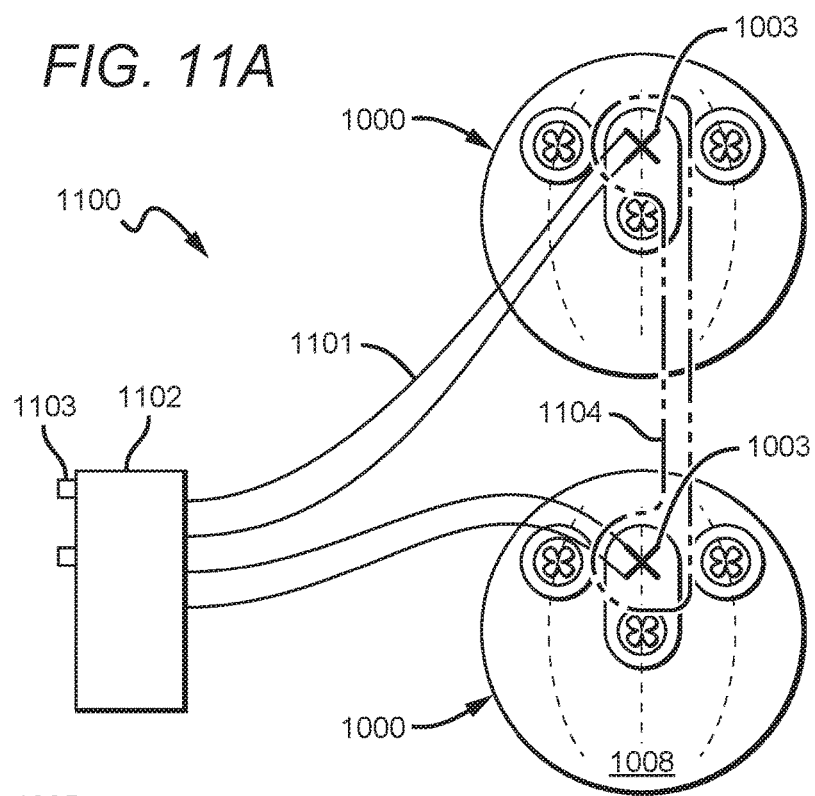
FIG. 11A is an antenna system with three HB beams and 4×4 MIMO for each HB beam and one LB beam with 2×2 MIMO (only LB ports are shown), according to one embodiment.
Figure 11B:
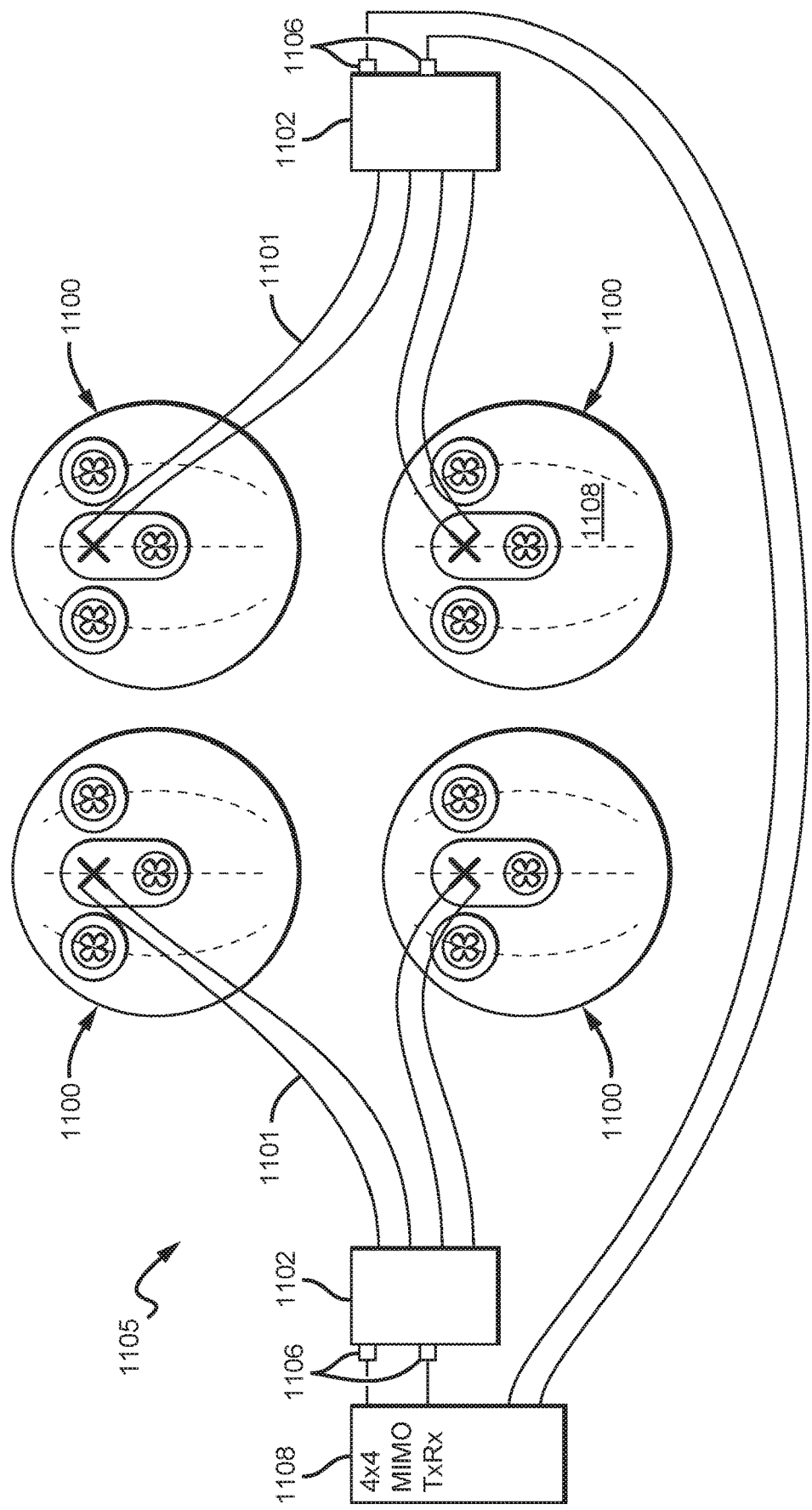
FIG. 11B is an antenna system with three HB beams and 8×8 MIMO for each HB beam and one LB beam with 4×4 MIMO (only LB ports are shown), according to one embodiment.

The 2-band lens antennas 900, 1000 can be used as independent antennas (e.g., for a 2×2 MIMO for each LB and HB radiator) or as building block for more complex antenna systems, as illustrated in FIGS. 11A-11B. In those figures, two examples of 2-band antennas are presented, both having three HB beams and one LB beam with similar elevation beam width. Cell coverage is similar to shown in FIG. 8.

Antenna system 1100 presented in FIG. 11A has two 2-band lens antennas 1000. The HB functionality is the same as for antenna 100 shown in FIGS. 1A and 1B (HB 3-beam with 4×4 MIMO, not shown, for each beam using twelve total connectors to interface three HB 4×4 MIMO transceivers, with one HB 4×4 MIMO transceiver per each of three subgroups of beams in one embodiment), described above. For LB operation, +45° and -45° polarized signals from top and bottom LB elements 1003, in subgroup 1104, through RF cables 1101 are combined/phase shifted in LB phase shifter 1102, which allows an LB beam to be tilted independently from HB beams. The LB elevation beam has approximately the same elevation beam width as the HB elevation beam. All four beams (three HB and one LB) of antenna system 1100 can be tilted independently, in the present embodiment. Antenna system 1100 has 12 HB ports (not shown) and 2 LB ports 1103, one for +45° and another for -45° polarized signals.

Antenna system 1105 shown in FIG. 11B has 24 HB ports (not shown) and four LB ports 1106 and consists of two antenna systems 1100 (as shown in FIG. 11A) placed side-by-side to each other. It is configured to provide 8×8 MIMO for each of three HB beams in their subgroups and 4×4 MIMO for one LB group of beams (by connecting four LB ports 1106 to LB 4×4 MIMO transceiver 1108). Isolation between all 28 ports is more than 25 dB in LB and HB bands. Cell coverage is similar to shown in FIG. 8.

In all 3-beam MIMO embodiments disclosed above, HB elevation beam was defined by one spherical lens and has stable 23±2° half power beam width (over wide frequency band 1.7-2.7 GHz and over wide range of tilting angles, 0-40°, see FIG. 2B) for azimuth and elevation. Some applications (macrocells, for example) require narrowed HB and LB elevation beam. In this embodiment, different lens antenna is used (see FIG. 12A) and these lens antennas are configured in vertical array (see FIGS. 13-14). Alternatively, for antenna system 1100 of FIG. 11A or 1105 of FIG. 11B, in lieu of antenna assemblies 1000, a different antenna assembly 900 can be used in another embodiment.

Figure 12A:
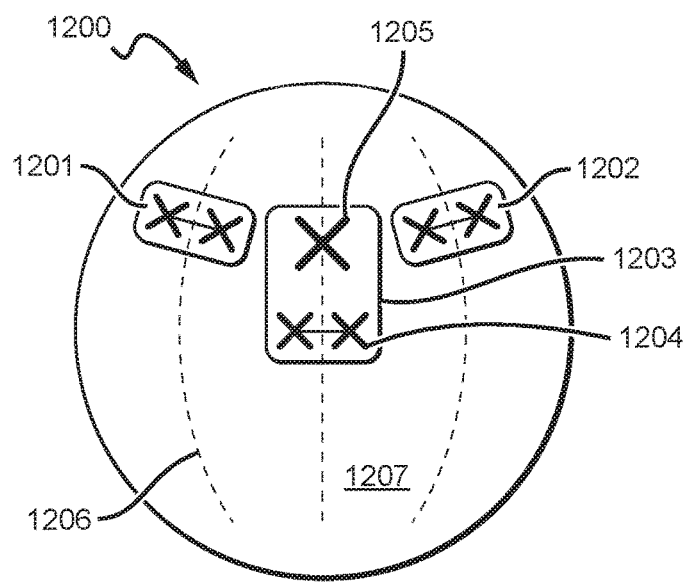
FIG. 12A is a 2-band spherical lens antenna for use as a building block for 2-band 3-beam antenna system with narrowed elevation pattern, according to one embodiment.

A 2-band lens antenna 1200 shown in FIG. 12A is similar to 2-band lens antenna 1000, but, in 2-band lens antenna 1200, HB element assembly 1201, 1202 uses a pair of HB elements for each of 2 outer HB beams, and central beam, 2-band element assembly 1203 uses a pair of HB elements 1204 co-located with LB element 1205. The LB element 1205 is similar to LB element 1003 of FIG. 11A. The HB element assembly 1201, 1202 and 2-band element assembly 1203 are located on tracks 1206 and can be moved independently by control mechanisms (not shown) around spherical lens 1207 in the present embodiment.

Figure 12B:
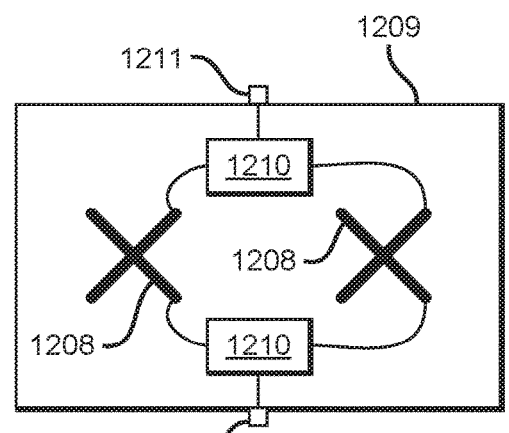
FIG. 12B illustrates HB element assembly of antenna FIG. 12A, according to one embodiment.
Figure 12C:
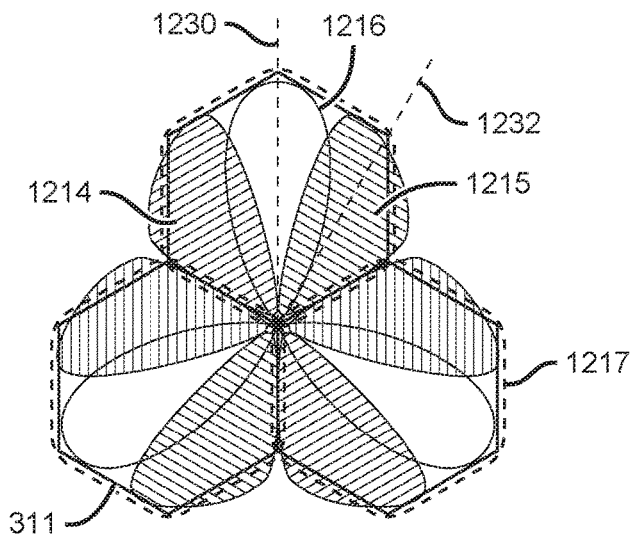
FIG. 12C is a three-hexagonal cell illustration providing 360° coverage, with each hexagonal cell coverage from a 2-band spherical lens antenna of FIG. 12A, according to one embodiment.

In FIG. 12B, HB element assemblies 1201, 1202, and HB 1204 (portion of central beam, 2-band element assembly 1203 of FIG. 12A) are shown in more details, in one embodiment. Each HB element assembly 1201, 1202, and 1204 has two (i.e., a pair of) spatially separated HB crossed dipoles 1208 (i.e., a dipole-pair) that have a cross-point placed in the plane of reflector 1209 and connected by two HB power dividers 1210 (one for each polarization) that are coupled to ports 1211, 1212. The HB power divider 1210 can be adjusted to provide something other than a 3 dB divider (e.g., a desired unequal, or biased, in a power or amplitude splitter, or division coefficient with respect to each of the HB crossed dipoles in the pair) and something other than an equal-phase divider (an unequal, or biased phase divider for each of the HB crossed dipoles in the pair) to tailor a beam shape and create asymmetrical patterns for outer beams 1214, 1215 in the azimuth plane (see FIG. 12C). For dynamic optimization of cell coverage and/or for interference reduction, power divider 1210 can have remotely controlled amplitude and/or phase adjustment of radiators 1208 communicated through an interface 1220 of antenna system to throw control ports (not shown) for adjustable power dividers 1210.

Referring now to FIG. 12C, a hexagonal cell coverage is shown using a 2-band spherical lens antenna of FIG. 12A per each hexagonal cell, or three such 2-band spherical lens antenna to cover 360° of all three hexagonal cells, similar to that shown in FIG. 3. For example, amplitude is higher on the HB crossed dipole 1208 that is closer to central track (i.e., the left HB crossed dipole 1208 for the HB element assembly 1202 and the right HB crossed dipole 1208 for the HB element assembly 1201, as viewed in FIGS. 12A and 12B) in one embodiment. Therefore, HB element assemblies 1201, 1202 can have different amplitude (amplitude adjustment) and phase distribution (phase shifted from one another) from each other to provide asymmetrical right and left outer beams, respectively. Dipoles in HB elements 1204 (located in 2-band element assembly 1203) have the same phase and the same amplitude to achieve symmetrical central beam 1216 of FIG. 12C, i.e. a pair of dipoles in HB elements 1204 has 3 dB power divider with equal phase. The LB beam 1217 is covering substantially the same geographical area, or footprint, e.g., +/−10, 15, 20, or 25% of cell area in different embodiments, as HB beams in pattern of outer and central beams 1214, 1215, 1216 (see FIG. 12C) and all of them configured to optimal coverage of cell 311. In the present embodiment, both the HB central beam 1216 and the LB beam 1217 are symmetrical about their own axis 1230, respectively. In contrast, HB outer beams 1214, 1215 are asymmetrical about their axis 1232. More specifically, left outer beam 1214 is symmetric with right outer beam 1215 about the axis 1230 of the center beam (forming an approximate mirror image). Asymmetric beam shape of HB outer beams also helps to reduce overlapping between HB beams, thereby minimizing interference with other sectors while improving capacity.

Figure 13:
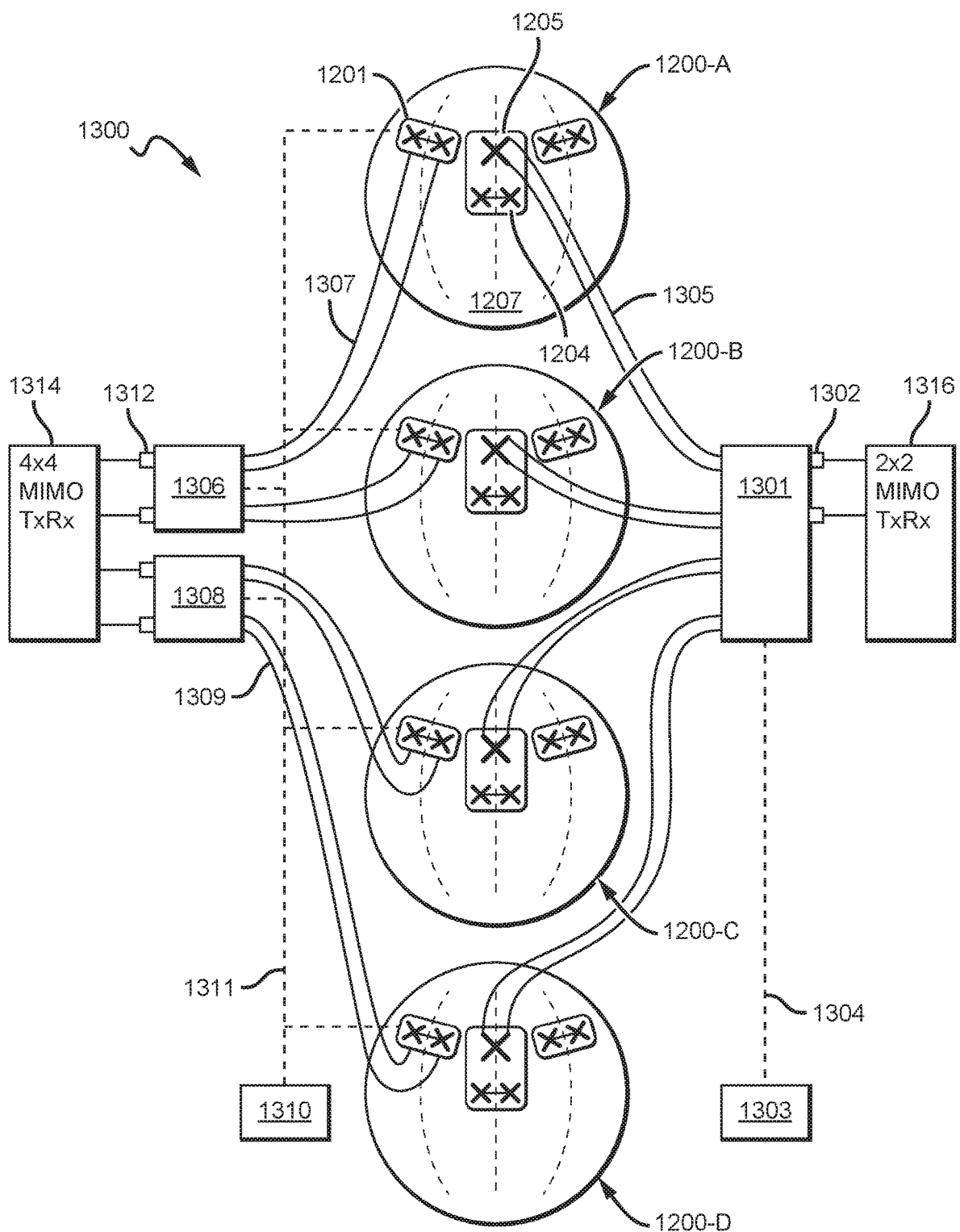
FIG. 13 is a 2-band antenna with three HB beams and 4×4 MIMO for each beam and one LB beam with 2×2 MIMO, with narrowed elevation beam, having 14 antenna ports, according to one embodiment.
Figure 14:
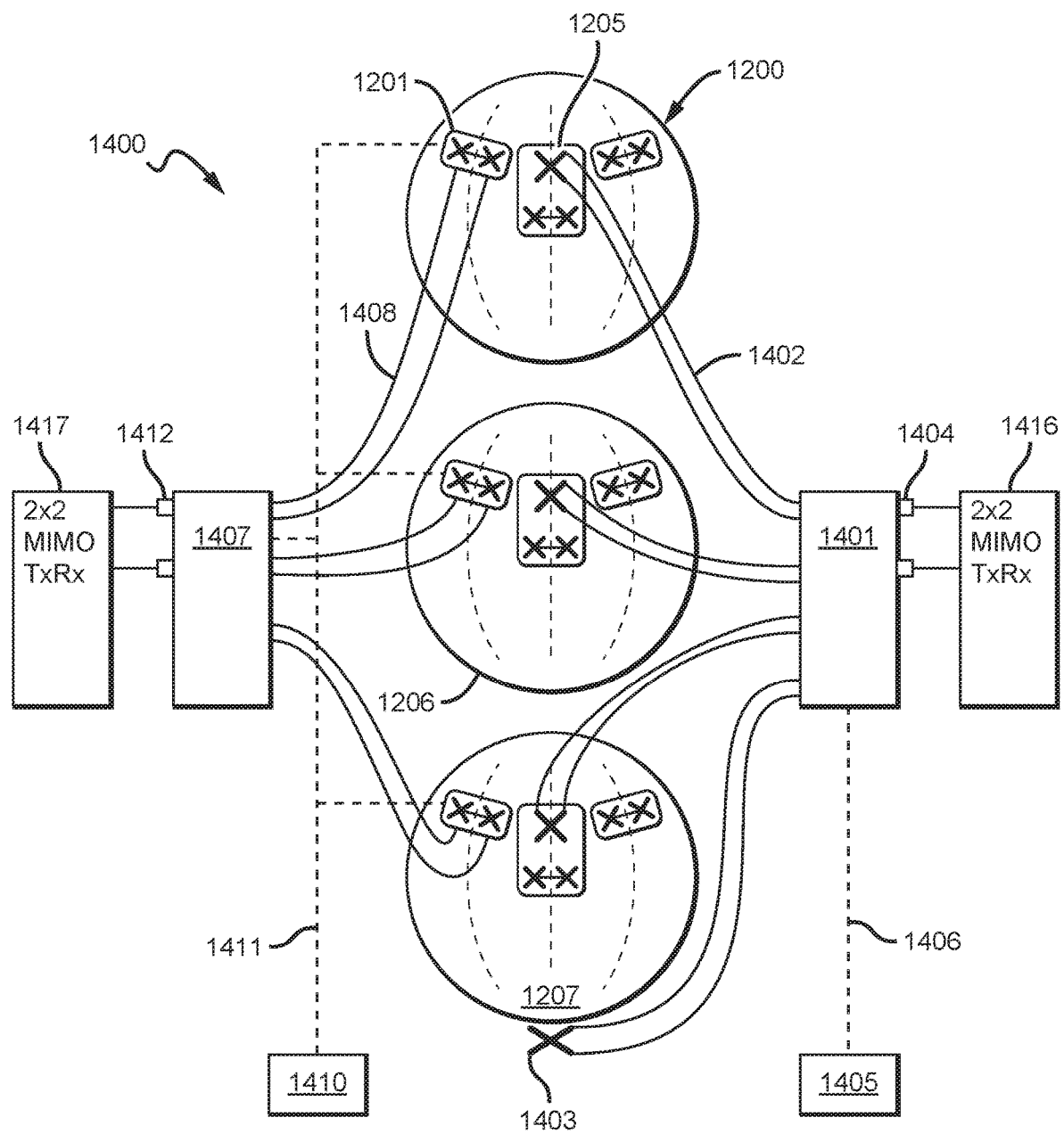
FIG. 14 is a 2-band antenna with three HB beams and 2×2 MIMO for each HB beam and one LB beam with 2×2 MIMO, with narrowed elevation pattern (total 8 antenna ports), according to one embodiment.
Figure 17A:
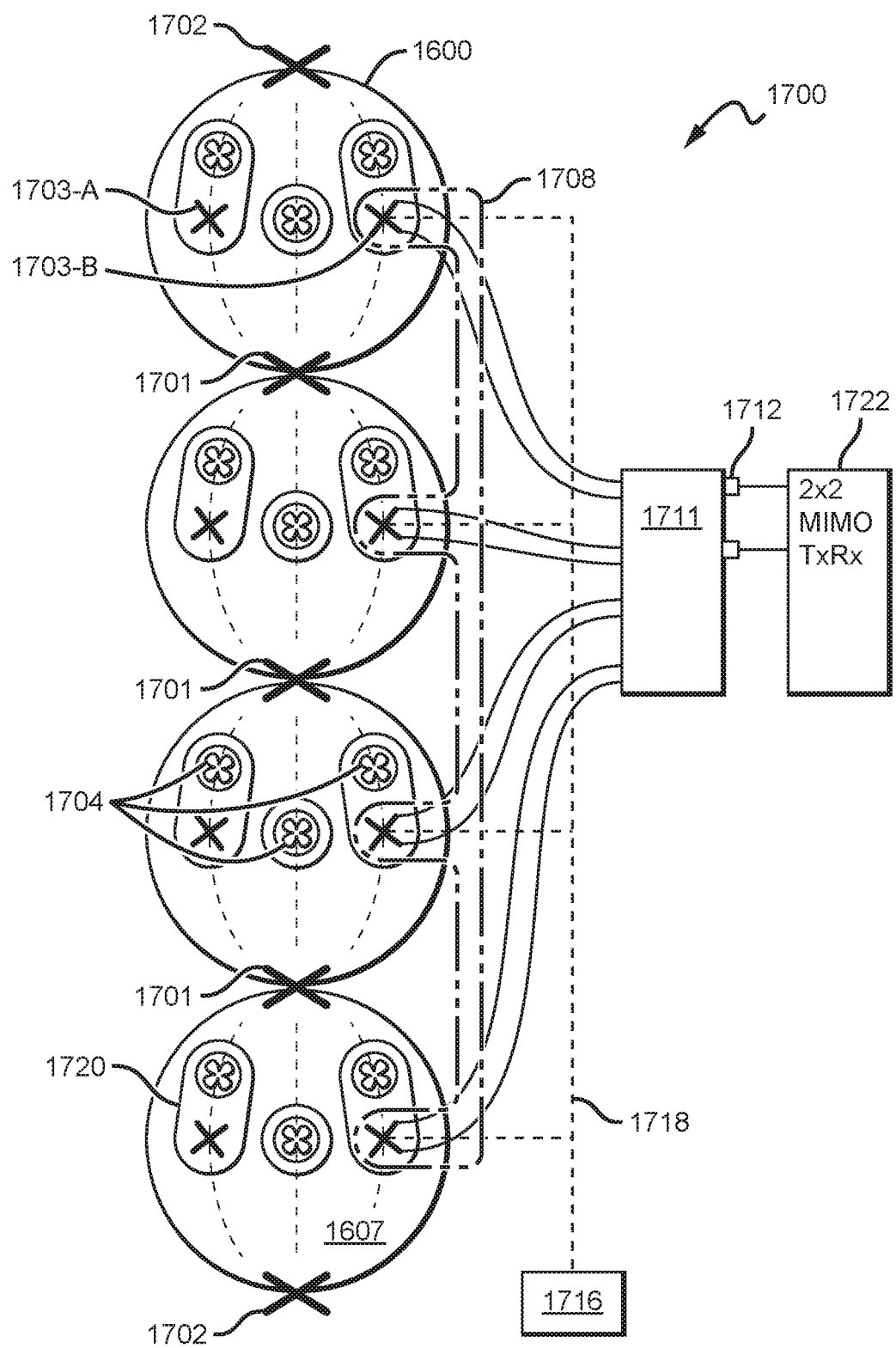
FIG. 17A is a 3-band antenna array, with one beam for a first band, two beams for a second band, and three beams for a third band, according to one embodiment.

The 2-band lens antenna 1200 has HB elevation half power beamwidth varying from 25° at 1.7 GHz to 15° at 2.7 GHz (much narrower compared to 21° at 2.7 GHz for 2-band lens antennas 900, 1000), with azimuth beamwidth of about 23°+/−2°. Narrowing of elevation beam width for higher frequencies of 2-band lens antenna 1200 allows for elevation grating lobes reduction, when several 2-band lens antennas 1200 are placed in vertical array and connected via phase shifter, as shown in FIGS. 13, 14, and 17A. One goal of the 2-band lens antenna 1200 is to be a building block for arrays of 2-band lens antennas with narrowed HB and LB elevation beams. Tailoring azimuth beam shapes as described in FIGS. 12A through 12C can be performed at each antenna assembly in a vertical stack as shown in subsequent FIG. 13, with variation from antenna assembly to antenna assembly. For example, a lowest antenna 1200-D can have a different bias distribution (stronger/more unequal bias, or a weaker/more equal bias) for each of the right outer, left outer, or center beam across the HB power divider 1210 (or alternatively a phase, amplitude, division coefficient divider) than adjacent or other antenna assemblies (i.e., 1200-C, 1200-B, 1200-A in the vertical array of lenses shape each of the left outer, right outer, or central beams as required or desired for interference reduction and/or isolation). This then results in a three-dimension power, amplitude, division coefficient, phase distribution mapping across the plurality of radiators in the antenna array.

A 14-port antenna system 1300, schematically shown in FIG. 13, is based on four vertically placed 2-band lens antennas 1200. Antenna system 1300 has LB phase shifter unit 1301 with two LB ports 1302 and controlled by control mechanism 1303 with LB mechanical linkage 1304 to provide required phase shift for LB beam tilt. By simultaneously shifting phase and adjusting the rotation angle/ position of the radiators (via mechanical linkage 1304 being coupled to both phase shifter 1306, 1308 and HB radiators 1201) grating lobes are reduced and/or essentially eliminated. The LB phase shifter unit 1301 is connected with all LB elements 1205 (described in FIG. 12A) in each of four 2-band lens antennas 1200 by LB cables 1305. Two LB antenna ports 1302 are connected to LB 2×2 MIMO transceiver 1316. In FIG. 13, HB circuits and HB tilt mechanism are shown for only first subgroup of HB beams; the total of all three subgroups of beams is three times that described for a single subgroup of HB beams. A top HB phase shifter unit 1306 with two HB ports 1312 is coupled to HB element assemblies 1201 (described in FIG. 12A) by two pair HB cables 1307 for a pair of top two 2-band lens antennas 1200, and a bottom HB phase shifter unit 1308 with two HB ports 1312 is coupled by two pair of HB cables 1309 to HB element assemblies 1201 for a pair of bottom two 2-band lens antennas 1200. The HB tilt mechanism includes an HB control mechanism 1310 which provides input for a required HB beam tilt, and the connecting HB mechanical linkage 1311 to HB phase shifter units 1306, 1308 and with each HB element assembly 1201, thereby providing (by the same movement) phase shift between HB element assemblies 1201 and, at the same time, mechanical movement of HB element assemblies 1201 on track 1206 (described in FIG. 12A) around spherical lens 1207. When extrapolated out with complete hardware, a total of 12 HB outputs 1312 are provided for the three HB element assemblies 1201 for each of the subgroups disposed around the four lens antennas 1200. Groups of four HB cables are coupled to one of six HB phase shifter units, e.g., 1306 or 1308, which are then coupled in pairs to one of three HB 4×4 MIMO transceivers, e.g., 1314, in a common band (HB), via ports 1312, with one HB 4×4 MIMO transceiver 1314 per each of the three subgroups of HB element (spanning across all four lens antennas 1200). Antenna system 1300 is similar in HB functionality to antenna system 100, i.e. providing 4×4 MIMO for each of three subgroups of beams, with a beam tilt range of 0-40°, and a similar shape of beams in azimuth plane. The difference is about half the HB elevation beam (with half power width of approximately 11-+/−2° in 1.7-2.7 GHz band) and about 3 dB higher gain. In addition, there is more flexibility for asymmetric outer beam shaping shown in FIG. 12C. The LB beam of antenna system 1300 has a half power beam width of about 50° in azimuth plane and about 15° in elevation plane and provides coverage 1217 (shown in FIG. 12C). Phase shifters for each of the subgroups of beams (e.g., phase shifters 1306 and 1308) usually have approximately the same phase shift, or if necessary for the best MIMO performance, different phase shift. Phase shifters {not shown} for the right column of right outer 2-polarized HB radiators for the top two lenses 1200-A and 1200-B, and for the bottom two lenses 1200-C and 1200-D) can be individually biased to distort the right outer beam and left outer beam, respectively, to create a substantially asymmetric respective right outer beam and left outer beam that conforms closer to the hexagonal cell boundaries and/or reduces interference (and increases isolation) with other beams and or with neighboring hexagonal cells. Performance can include coverage of 80% and more of the geometric footprint desired (e.g., a hexagonal cell of FIG. 12C, or any other cell shape such as triangular, rectangular, parallelogram, etc.). For further improvements of antenna system 1300 in one embodiment, additional non-movable HB and/or LB or dual band (HB+LB) elements can be placed between antennas 1200 and/or on outer top and bottom ends of assembly of antennas 1200 (similar to that shown in FIG. 17A for LB elements).

In FIG. 14, another embodiment of a 2-band antenna system 1400 is schematically shown, based on three 2-band lens antennas 1200 placed close to each other in vertical array. Antenna system 1400 has LB phase shifter unit 1401 connected by LB cables 1402 with all 3 LB elements of 2-band lens antenna 1200 and additional LB element 1403 (optional). Two LB ports 1404 of antenna system 1400 (at the same time they are outputs of LB phase shifter unit 1401) are connected to LB 2×2 MIMO transceiver 1416. The LB beam tilt is controlled by control mechanism 1405 with LB mechanical linkage 1406 connected to LB phase shifter unit 1401. The HB circuits of antenna system 1400 are shown for first (left outer) beam only for simplicity. The HB phase shifter unit 1407 is connected to HB element assemblies 1201 for 2-band lens antenna 1200 by HB cables 1408. The HB control mechanism 1410 is providing required HB beam tilt, and it is connected by HB mechanical linkage 1411 to HB phase shifter unit 1407 and with HB element assemblies 1201 of each 2-band lens antenna 1200, providing (by the same movement) phase shift between HB element assemblies 1201 and, at the same time, providing mechanical movement of HB element assemblies 1201 on track 1206 around spherical lens 1207. A total of four control mechanisms are required: three HB 1410 (for element/phase shifter movement) and one LB control mechanism 1405 (for phase shift). Each HB phase shifter unit 1407 is coupled to its own 2×2 MIMO transceiver 1417 for its respective subgroup of HB element assemblies 1201.

In one embodiment, an arc phase shifter (see, for example, U.S. Pat. No. 7,907,096) or a linear phase shifter (see, for example, U.S. Pat. No. 7,026,889) can be used as LB phase shifter unit 1401 and as HB phase shifter unit 1407, while the same control mechanisms 1410 can be used for phase shift and for rotation of HB radiation elements around spherical lens 1207. The present disclosure includes a wide range of phase shifter embodiments including, but not limited to, mechanical phase shifter with linear movement of a dielectric body, such as U.S. Pat. No. 6,906,666, rotational phase shifter such as U.S. Pat. No. 7,196,674, and electronic phase shifters. Different combinations of phase shifters are also feasible in the present disclosure, such as enhancing a mechanical phase shifter having linear movement with an electronic phase shifter for fine adjustments (as shown in FIGS. 13 and 14 embodiments providing one possible elegant solution where orbiting of RF element and phase shifting are provided with the same linear movement, i.e. based on single input). The required phase shift is: $\varphi=(2\pi d \sin\theta)/\lambda$ Where $\theta$ is the required tilt angle, and if $\theta<35$ deg., $\varphi\approx(2\pi d\theta)/\lambda$, i.e. phase shift is proportional to tilt angle. In arc phase shifter, phase shift $\varphi$ is also directly proportional to rotation angle of wiper on arc, and, as shown in FIG. 2B, rotational angle 222 of element around sphere is approximately equal to beam tilt angle 221. So, the same movement can be used for phase shift and rotation of radiation elements around sphere.

The three 2-band lens antennas 1200 in FIG. 14 are used in 2-band antenna system 1400 for elevation beam width reduction for both HB and LB. For further LB beam width reduction, additional LB element 1403 is also used (1403 is optional). For HB, elevation half power beam width of antenna system 1400 is 5-8° at 1.7-2.7 GHz (compare to 21-25° for antenna system 100), and for LB, elevation half power beam width is 14-19° at 0.69-0.96 GHz band, with total antenna length of about 1.2 m in one embodiment with four lenses. Narrower elevation beamwidth of antenna system 1400 is welcome for some macrocell applications. When complete hardware is extrapolated out for the embodiment of FIG. 14, a total of 18 HB outputs 1211, 1212 (of FIG. 12B) for each of HB dividers 1201, 1202, 1204 (of FIG. 12A) are connected to one of three HB phase shifter units 1407 (of FIG. 14) which are then connected to one of three HB 4×4 MIMO transceivers, with one HB 2×2 MIMO transceiver per each of the three subgroups of beams. In one embodiment, phase shifters 1401 have multi-arc properties.

Elevation pattern of 2-band antenna system 1400 for 2.7 GHz and 28° beam tilt is shown in FIG. 15, with narrow half-power beam width 1501 (5°). It has improved (e.g., ~≤−20 dB) upper side lobe 1502 suppression (for less interference with other cells) and increased (~≥−15 dB) low side lobe 1503 level (for better cell coverage). To do this, rotational angle 222 of element around sphere was increased by 2.0-30°. Thus, rotation angle 222 of radiation element around sphere is recommended to be slightly more than $\theta$, close to $\theta+\epsilon/2$, where c is half power beamwidth 1501 in the elevation plane.

The HB azimuth radiation patterns of 2-band antenna system 1400 are similar to pattern shown in FIG. 2A and have stable 23±2° half power beam width (over wide frequency band 1.7-2.7 GHz). The LB pattern of antenna system 1400 has half power beam width about 50° in azimuth plane. Tilt range is 0-40° for both bands.

Still referring to FIG. 14, the 2-band antenna system 1400 has 8 ports (6 HB+2 LB) with all two LB ports 1404 shown, but only 2 HB ports 1412 shown (for simplicity), for one HB beam, of the total six HB ports 1412.

In another 2-band antenna embodiment (not shown), where an LB element and a pair of HB elements are located on different reflectors, LB control mechanism 1405 can provide not only LB phase shift, but also movement of LB element for more independent LB beam tilt.

In a 3-band antenna embodiment (not shown), 2-polarized radiators of a 3rd band (for example, 400-600 MHz in a crossed dipoles embodiment), can be placed between 2-band lens antennas 1200, and beam tilt of a 3rd band can be achieved with a 3rd band phase shifter.

Figure 16A:
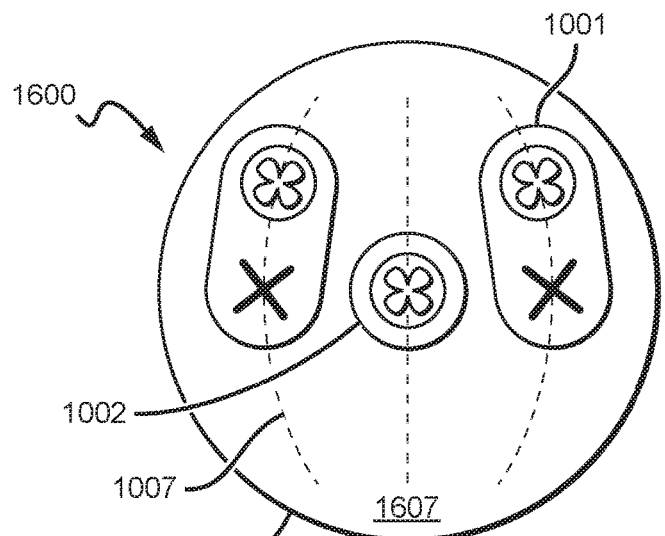
FIG. 16A is a 2-band lens antenna with three HB beams having 2×2 MIMO for each HB beam and with two LB beams having 2×2 MIMO for each LB beam, according to one embodiment.

In FIG. 16A, another 2-band lens antenna 1600 embodiment is shown. It has three HB and two LB beams covering a 120° sector and having a total of 10 ports. It is similar to the 2-band lens antenna 1000 (of FIG. 10A), but it has two HB/LB element assemblies 1001 located on outer tracks 1007, and one (central) HB 2-polarized radiator 1002 located on center track 1007 of lens 1607. As the 2-band lens antenna 1000 is adjusted up and down the track 1007, both the LB element 1003 and the HB element 1004 are selectively tilted together as a single unit, to create the beam formation desired for a given cell and environment.

Figure 16B:
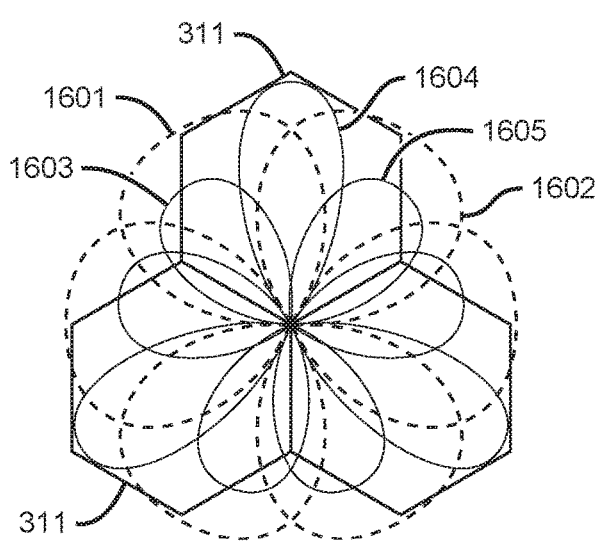
FIG. 16B is a three-hexagonal cell illustration providing 360° coverage, with each hexagonal cell coverage provided by a of 2-band antenna with three HB beams and two LB beams, according to one embodiment.

In FIG. 16B, cell coverage is shown with two LB beams 1601, 1602 and three HB beams 1603, 1604, 1605, all covering the same hexagonal cell 311. This pattern is repeated for all three hexagonal cells 311 to provide 360° coverage, with one antenna 1600 for each hexagonal cell, for a total of three antennas 1600 total for all three hexagonal cells. FIG. 16B illustrates how LB beams 1601 overlap each other intracell (within a given cell) and intercell (between two or more cells) with low interference between hexagonal cells 311. Outer HB beams 1603, 1605 shown in FIG. 16B have more tilt compared to central HB beam 1604, for better cell coverage (similar to FIG. 3B). Lens antenna 1600 can be used as building block for 2-band MIMO antenna system, similar as shown in FIGS. 5A-5C and FIGS. 11A-11B. In FIG. 17A, tri-band lens antenna system 1700 is shown, with independent beam tilt for each band. These three bands, for example, can be 550-960 MHz (1st band, LB), 1.43-2.17 GHz (2nd band, middle band, or mid-band, (MB) or intermediate band (IB)) and 2.49-3.7 GHz (3rd band, HB). This 3-band antenna system 1700 embodiment can cover all current and prospective cellular communication bands in one unit. As shown in FIG. 17A, 3-band antenna system 1700 comprises several 2-band lens antennas 1600 (similar to that shown in FIG. 16A) with 1st band radiation elements 1701 (not movable) disposed between lenses 1607 and optionally 1st band radiation elements 1702 disposed beyond top and bottom ends of outer lens antennas 1600 in 3-band antenna system 1700. Non-movable 1st band radiation elements 1701, 1702 can be mechanically pre-tilted down for better tilt range. Each lens antenna 1600 has two 2-polarized MB radiators of 2nd band 1703-A and 1703-B, and has three 2-polarized HB radiators of 3rd band 1704, with each of the latter including an optional secondary lens. The (outer) HB/MB element assemblies 1720 are located on outer tracks and one (central) HB 2-polarized radiator 1704 is located on the center track. Another band assignment embodiment includes a LB within 500-1000 MHz, a MB within 1.4-2.7 GHz, and a HB within 2.2-3.8 GHz. By optionally embedding $1^{st}$ band radiation elements 1701 and 1702 into lenses 1607, the tri-band antenna system 1700 has approximately a same size and layout as a two-band antenna system.

In each of the bands of the, 3-band antenna system 1700 can provide wide tilt range, e.g., 0-40°. For the 1st band, a beam tilt is provided by phase shifting only, analogous to FIG. 7A. For the 2nd and 3rd band, beam tilt is provided by combination of phase shifting and radiators rotation, analogous to FIG. 14. Beam tilting components (phase shifters, control mechanism) are similar to those described above and are only shown in FIG. 17A for MB elements 1703 for simplicity. Antenna system 1700 has MB phase shifter unit 1711 connected by MB cables 1714 with all four MB elements 1703 of 3-band lens antenna 1200 and an output of two ports 1712 to 2×2 MIMO transceiver 1722. The MB beam tilt is controlled by control mechanism 1716 with MB mechanical linkage 1718 connected to MB phase shifter unit 1711.

Referring now to FIG. 17B, cell coverage is shown for a 3-band antenna system 1700, for a single hexagonal cell 311. The 3-band antenna system 1700 forms one beam 1705 in 1st band (LB), two beams 1706 in a left and right version for the 2nd band (MB) and three beams 1707 in 3rd band (HB), covering the same cell 311, i.e., substantially the same geographical area. In one embodiment, the left and right MB beams 1706 of FIG. 17B together cover 80% or more of a common geometric footprint area, namely the hexagonal cell, 311. This same result is repeated for another lens antennae 1600 disposed adjacent to a first lens antennae 1600, wherein the left and right MB beams 1706 of the second lens antennae 1600 together cover 80% or more of a common geometric footprint area as well.

Figure 18:
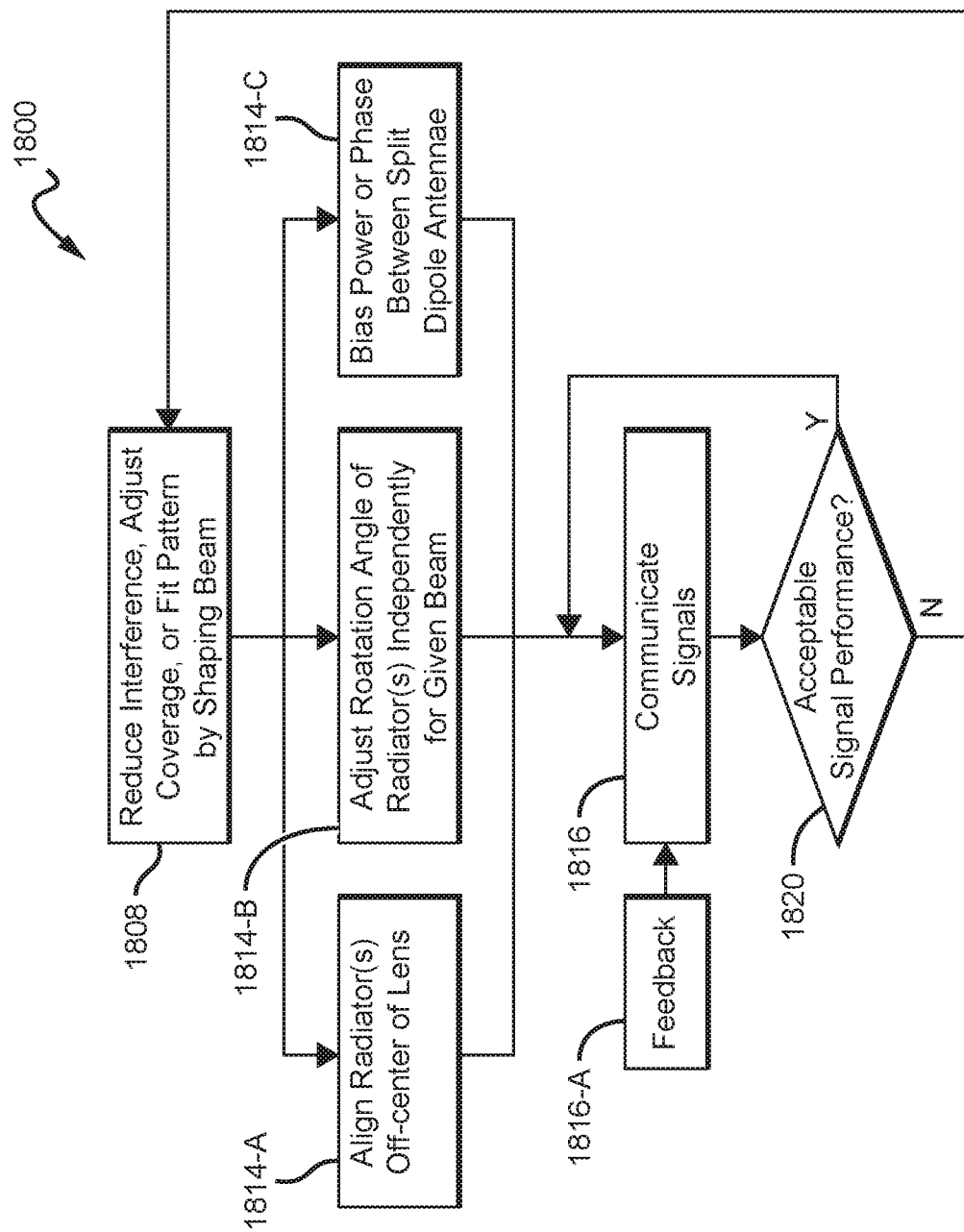
FIG. 18 is a flowchart for adjusting cell coverage, shaping capacity, reducing interference, and/or shaping a beam to fit a pattern according to one embodiment.

Referring now to FIG. 18, a flowchart 1800 is shown adjusting cell coverage, shaping capacity, reducing interference, and/or shaping a beam, for an antenna system per operation 1808, according to one embodiment. This is accomplished by using one or more of the subsequent operations of: i) aligning one or more radiator(s) off-center of the lens 1814-A, as described/shown in FIGS. 1A-1B and 3C above; ii) adjusting a rotation angle of one or more radiator(s) 1814-B either independently, based on sector location, subgroup, or RF band, e.g., as described/shown in FIGS. 3B, 3C 12C, 16B and 17B; and/or iii) biasing power and/or phase either independently or dependently between a split dipole antennae, as described/shown in FIGS. 12A-12C above.

Data signals are communicated 1816 on the antenna system using a statically set default factory setting for factors of 1814. Then antenna performance settings can be subsequently and selectively adjusted statically or dynamically using either automatically or remotely using feedback, or preprogrammed patterns to adapt one or more antenna for changing or known data traffic, weather, interference environments, and other conditions and patterns. Operation 1820 inquires if the signal performance is acceptable, as measured by one or more feedback metrics 1816-A of direct performance such as dropped calls, call signal integrity, measured error rates, interference from neighboring cells or sectors, power consumption, etc. or by collateral performance metrics interference indicators, etc. If signal performance is acceptable, then the process 1800 continues communicating signals 1816 and measuring performance. If signal performance is unacceptable, then the process returns to operation 1808.

All proposed solutions are modular and based on building blocks, which is very practical for field deployment (flexibility in the site construction) and beneficial for production (less parts in stock).

Advantages over other attempted solutions (multi-beam antennas with Butler matrix) include the following performance metrics.

Higher gain efficiency (less insertion loss).

Wider frequency band (50%+).

Dual- and multi-band wideband operation.

Exceptional port-to-port isolation (typically, 10-15 dB better), which allows good MIMO performance.

No pattern distortion or scanning gain loss for outer beams.

Mechanically, 25-30% narrower (with the same azimuth (Az) beam width).

Significant (2~3 times) lower frontal and rear wind load (thanks to rounded shape and better aperture efficiency).

Excellent independent beam tilt performance.

Extended beam tilt, 0-40° (3-4 times more)

Much better stability of beams (width, crossover level, pointing position and roll-off.

Excellent azimuth and elevation side lobe suppression in wide frequency band.

Outstanding modularity for easier field deployment.

Rounded, aesthetically pleasant shape.

Flexibility of adapting and optimizing coverage for different geographical areas.

Interference reduction by minimizing overlapping of beams between sectors and between cells.

Proposed multi-beam antenna solutions for 2×2, 4×4 and 8×8 MIMO can be used for micro cells, hot spots, metro cells, macrocells, and, also, for stadium and special events' coverage.

Reviewing the embodiments presented herein, in most embodiments, LB radiators forming a beam are disposed in a single vertical plane, as shown (e.g., FIGS. 7A, 11A, 13, 14, 17A, and 17C. Variations of this alignment are provided in FIGS. 11B and 16A where LB radiators are not aligned only in a single vertical plane. Similarly, in most embodiments, radiators of each subgroup of radiators for other RF bands (and their tracks) are located in a same vertical plane for forming a beam. In another embodiment, a radiators of a given frequency band can be arranged in a matrix, such as FIG. 11B, where the radiators for a given cell has a beam formed from both a vertical array (top and bottom antennas) and a horizontal array (side by side antennas).

In one embodiment, the lenses are not cylindrical in shape. The performance of a cylindrical lens is limited in that it does not allow the beneficial beam forming and the variable elevation positioning that is possible with a spherical lens. Furthermore the single cylindrical lens does not offer the performance capability of stacked spherical lenses, either touching, interlaced (as shown in FIG. 6A), or closely disposed to each other, wherein each spherical lens having its own radiators that are associated only with it.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of a, b, c . . . and n, the text should be interpreted as requiring only one element from the group, not a plus n, or b plus n, etc. Although the present description describes a common hexagonal geometric (aka geographical) footprint ("hex cell"), the present description is readily adaptable to any desired geometric or geographical footprint, such as a polygon with three through at least eight sides or more, by symmetrically or asymmetrically adjusting a phase-shift and amplitude of the single or multi-band signals, and by symmetrically or asymmetrically adjusting the tilt, circumferential position, and quantity of radiator(s) around the spherical lens, and by using any combination of spherical lenses and HB and LB antenna as described herein.

The invention claimed is:

1. A multi-beam antenna assembly comprising:
a first lens antenna and a second lens antenna, wherein each lens antenna comprises a spherical lens, a radiator, and a beam group;
wherein the beam group comprises at least a first beam and a second beam;
a control mechanism coupled to the radiator, wherein the control mechanism is configured to tilt the beam group;
wherein at least one of the first lens antenna and the second lens antenna comprise at least one port of a plurality of ports;
a MIMO transceiver functionally coupled to at least one port of the plurality of ports and the beam group;
wherein at least one of the first beam and second beam are configured to provide coverage to at least a portion of a common coverage area;
wherein the control mechanism is configured to move the radiator along a first vertical arc of the spherical lens of the first lens antenna; and
wherein the control mechanism is further configured to move the radiator along a second vertical arc of the spherical lens of the first lens antenna.

2. The multi-beam antenna assembly of claim 1, wherein the MIMO transceiver is configured to transmit or receive both low-band (LB) and high-band (HB) signals simultaneously.

3. The multi-beam antenna assembly of claim 1, wherein the first beam and the second beam have the same coverage area.

4. The multi-beam antenna assembly of claim 1 further comprising a low band (LB) beam group and a high band (HB) beam group.

5. The multi-beam antenna assembly of claim 4, wherein the first lens antenna produces the LB beam group, and the second lens antenna produces the HB beam group.

6. The multi-beam antenna assembly of claim 1, wherein the radiator comprises at least one of an HB element and an LB element.

7. The multi-beam antenna assembly of claim 6, wherein the LB element is coupled to a LB MIMO transceiver via a LB phase shifter, and the HB element is coupled to a HB MIMO transceiver via a HB phase shifter.

8. The multi-beam antenna assembly of claim 5, wherein at least one of the first lens antenna and the second lens antenna is a tri-band antenna configured produce the LB beam group, a middle-band (MB) beam group, and the HB beam group.

9. The multi-beam antenna assembly of claim 8, wherein the LB beam group, the MB beam group, and the HB beam group cover a common coverage area.

* * * * *